(12) United States Patent
Azuma et al.

(10) Patent No.: US 9,769,371 B1
(45) Date of Patent: Sep. 19, 2017

(54) PHASE DETECT AUTO-FOCUS

(71) Applicant: Amazon Technologies, Inc., Reno, NV (US)

(72) Inventors: Eddie Alex Azuma, Pleasanton, CA (US); Leo Benedict Baldwin, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 292 days.

(21) Appl. No.: 14/481,536

(22) Filed: Sep. 9, 2014

(51) Int. Cl.
| | |
|---|---|
| *G03B 13/00* | (2006.01) |
| *H04N 5/232* | (2006.01) |
| *G02B 7/09* | (2006.01) |
| *H04N 5/369* | (2011.01) |
| *G02B 7/36* | (2006.01) |
| *G02B 7/28* | (2006.01) |

(52) U.S. Cl.
CPC ........... *H04N 5/23212* (2013.01); *G02B 7/09* (2013.01); *H04N 5/3696* (2013.01); *G02B 7/285* (2013.01); *G02B 7/36* (2013.01)

(58) Field of Classification Search
CPC .... H04N 5/3696; H04N 5/23212; G02B 7/09; G02B 7/34–7/346
USPC .......................................... 348/345, 350–351
See application file for complete search history.

(56) References Cited

U.S. PATENT DOCUMENTS

| | | | | |
|---|---|---|---|---|
| 5,237,362 A | * | 8/1993 | Ishino | G02B 7/10 396/79 |
| 6,816,199 B1 | | 11/2004 | Ide | |
| 7,405,762 B2 | * | 7/2008 | Nonaka | H04N 5/23212 250/201.7 |
| 7,512,328 B2 | * | 3/2009 | Suda | G03B 17/00 348/208.12 |
| 7,576,796 B2 | | 8/2009 | Kanayama | |
| 8,139,142 B2 | | 3/2012 | Bamji | |
| 8,237,849 B2 | * | 8/2012 | Tanaka | G02B 7/08 348/348 |
| 8,531,560 B2 | * | 9/2013 | Kimura | G02B 7/102 348/247 |

(Continued)

OTHER PUBLICATIONS

Richard Butler. "Exclusive: Fujifilm's phase detection system explained." <http://www.dpreview.com/articles/2151234617/fujifilmpd> Aug. 5, 2010, 5 pages.

(Continued)

*Primary Examiner* — Ngoc-Yen Vu
(74) *Attorney, Agent, or Firm* — Eversheds Sutherland (US) LLP

(57) ABSTRACT

An phase detect (PD) module including a phase detect (PD) lens, PD image sensor, and a PD controller is disclosed. The PD module may be configured to provide a control signal to an electromechanical device, such as a voice coil motor (VCM), of an image capture module to move a lens assembly to focus an image of an object to be imaged onto a primary image sensor. The PD module may direct the capture of a PD image by the PD image sensor and perform a phase detect (PD) technique on the captured AF image to identify a focus point of the lens assembly. This determined focus point may be used to displace the lens assembly relative to the primary image sensor to achieve focus of the object onto the primary image sensor.

20 Claims, 9 Drawing Sheets

(56) References Cited

U.S. PATENT DOCUMENTS

| | | | | |
|---|---|---|---|---|
| 8,619,182 | B2* | 12/2013 | Fainstain | H04N 5/23212 348/335 |
| 8,704,941 | B2* | 4/2014 | Takeuchi | G02B 7/36 348/350 |
| 8,792,048 | B2* | 7/2014 | Takeuchi | H04N 5/23212 348/345 |
| 8,890,942 | B2* | 11/2014 | Ogasahara | H04N 5/2254 348/345 |
| 8,890,997 | B2* | 11/2014 | Sasaki | G02B 7/30 348/350 |
| 9,549,115 | B1* | 1/2017 | Baldwin | H04N 5/23212 |
| 9,568,709 | B2* | 2/2017 | Isobe | G02B 7/08 |
| 2003/0117719 | A1 | 6/2003 | Wakai | |
| 2003/0184669 | A1 | 10/2003 | Nishioka | |
| 2006/0044454 | A1 | 3/2006 | Kuwakino | |
| 2007/0047942 | A1 | 3/2007 | Chang | |
| 2008/0080028 | A1* | 4/2008 | Bakin | G06T 1/0007 358/514 |
| 2010/0166405 | A1 | 7/2010 | Moon | |
| 2011/0063484 | A1 | 3/2011 | Fujii et al. | |
| 2013/0250067 | A1 | 9/2013 | Laxhuber | |
| 2013/0341493 | A1 | 12/2013 | Ando | |
| 2015/0098005 | A1* | 4/2015 | Tsai | H04N 5/3696 348/336 |
| 2015/0365609 | A1* | 12/2015 | Mine | H04N 5/332 348/164 |
| 2015/0373252 | A1 | 12/2015 | Georgiev | |

OTHER PUBLICATIONS

"Evolution into the X-Trans CMOS II Sensor with Phase Detection Pixels. AF Speed Achieving the Level of Single Lens Reflex Cameras." <http://fujifilm-x.com/development_story/en/sensor/> 4 pages.

Zhang, Michael; "A Demo of Split Screen and Microprism Ring Focusing in Old SLRs." Published Jan. 2, 2013. Accessed Sep. 22, 2014 at: http://petapixel.com/2013/01/02/a-demo-of-split-screen-and-microprism-ring-focusing-in-old-sirs/ (9 pgs.).

* cited by examiner

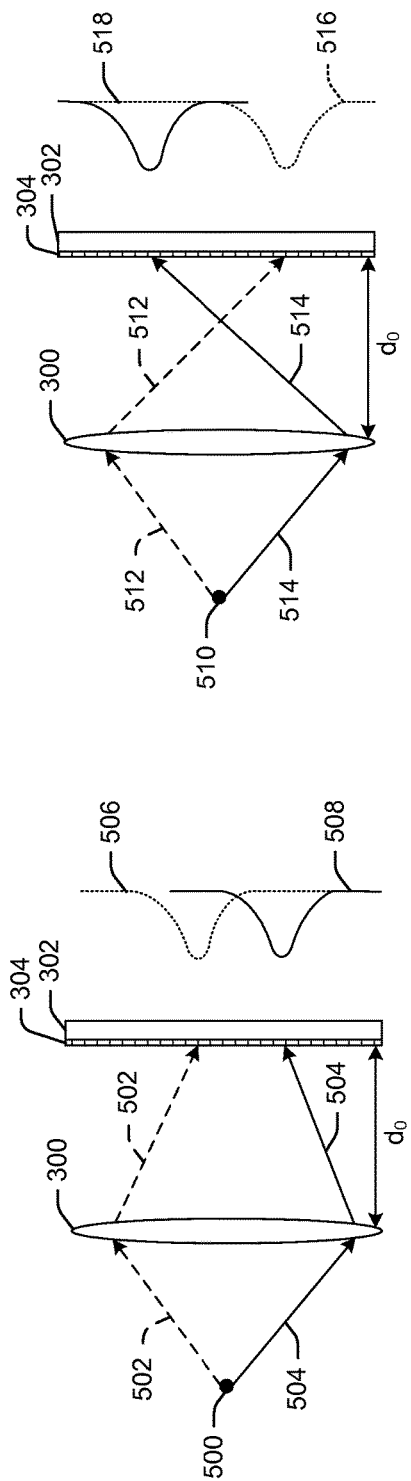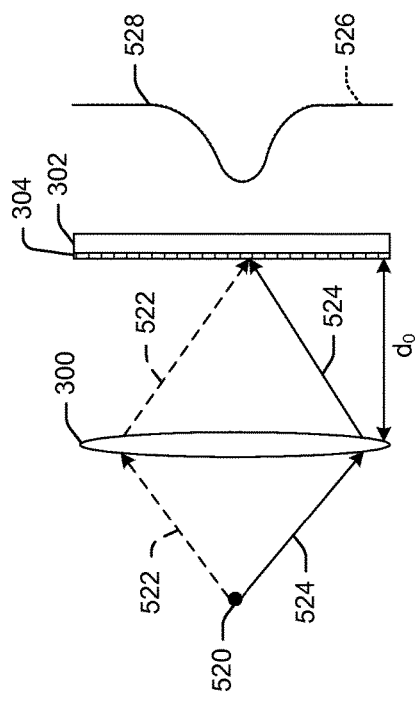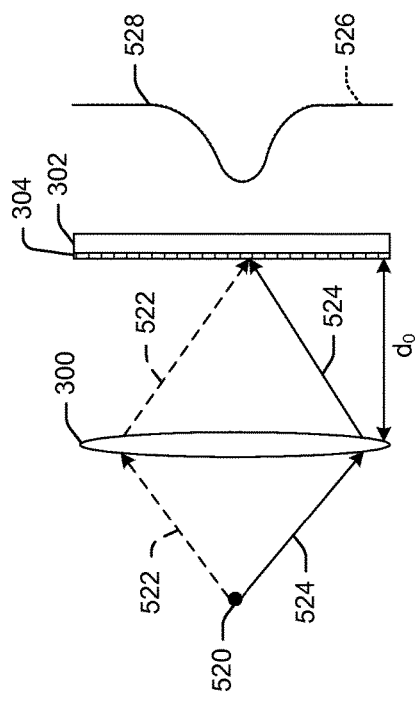

PHASE DETECT AUTO-FOCUS

BACKGROUND

Imaging systems with semiconductor image sensors (e.g., charge coupled device (CCD) image sensors, complementary metal oxide semiconductor (CMOS) image sensors, etc.) may use a variety of mechanisms for autofocus of an image to be captured. These mechanisms may use, for example, a sweep through a range of the focal lengths to find an appropriate focal length that produces a sharp image. These types of mechanisms may require a relatively long time to find the appropriate focal distance and may lead to a relatively poor user experience. Other mechanisms may include using phase detection (PD) where some of the pixels of the image sensor may be devoted to identifying a focal length and/or the focal displacement. In this case, devoting some pixels of the imaging sensor may lead to reduced image quality, as well as additional image processing to remove any effects of the PD pixels from the captured image. Additionally, image sensors with relatively high pixel counts may result in a user perceptible latency in determining the focus point and/or the focus offset.

BRIEF DESCRIPTION OF DRAWINGS

The detailed description is set forth with reference to the accompanying figures. The use of the same reference numbers in different figures indicates similar or identical items; however, various embodiments may utilize elements and/or components other than those illustrated in the figures.

FIG. 5A is a schematic diagram that illustrates an example object image detection by the PD module of FIG. 1, in accordance with example embodiments of the disclosure.

FIG. 5B is a schematic diagram that illustrates another example object image detection by the PD module of FIG. 1, in accordance with example embodiments of the disclosure.

FIG. 5C is a schematic diagram that illustrates yet another example object image detection by the PD module of FIG. 1, in accordance with example embodiments of the disclosure.

DETAILED DESCRIPTION

Overview

Figure 1:
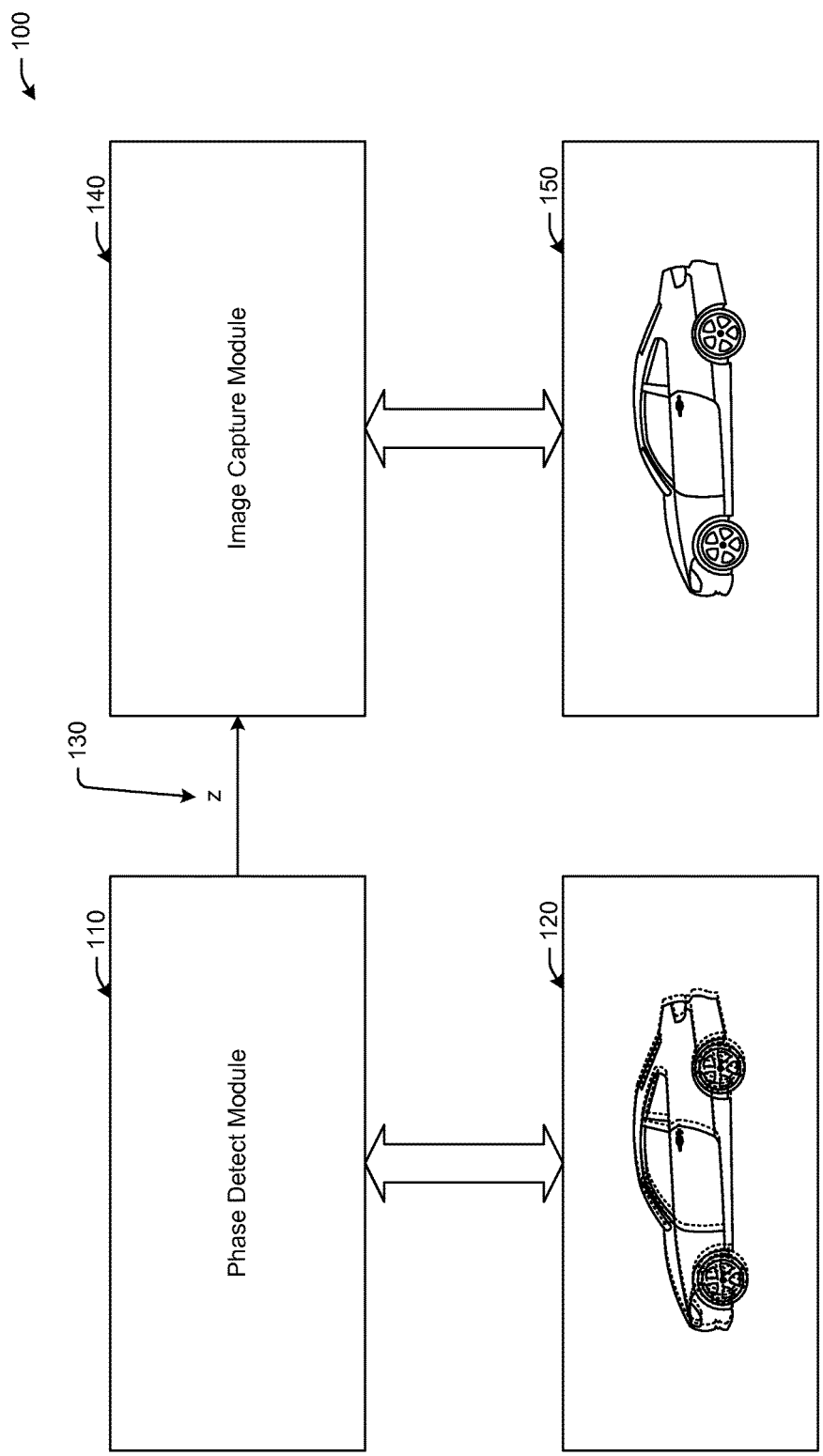
FIG. 1 is a schematic diagram that illustrates an example environment where an phase detection (PD) module provides one or more parameters and/or control signals to an image capture module for capturing an image, in accordance with example embodiments of the disclosure.

Example embodiments of the present disclosure are directed to, among other things, autofocus (AF) for the capture of images using phase detect (PD) technique. The AF for the capture of images may be implemented on any variety of user devices, such as a camera, smart phone, tablet computing device, laptop computer, wearable user devices, or the like. In example embodiments, a PD module may be configured to identify one or more parameters that may be used to control aspects of an image capture module, such that the image capture module captures a focused image of an object in a scene to be imaged by the image capture module.

According to example embodiments, a PD module may include a PD image sensor module. The PD image sensor module, in example embodiments, may include a PD image sensor and optical elements, such as one or more lenses. The PD image sensor may be any suitable type of image sensor, such as a complementary metal oxide semiconductor (CMOS) and/or charge coupled device (CCD) image sensor. In example embodiments, the PD image sensor module may be a fixed focus-lens configuration. In other words, in these example embodiments, the distance between the PD image sensor and a lens assembly of the PD image sensor module may be fixed. Put yet another way, the nodal distance, or the distance between the node of the lens assembly of the PD image sensor module and the imaging plane, or otherwise a location of photosensitive pixel elements of the PD image sensor, may be fixed in these example embodiments. Additionally, in these example embodiments, the focal length of the optical element(s) (e.g., lenses) may be fixed.

According to example embodiments, the PD module may further include a PD controller. In some example embodiments, the PD controller may include one or more processor(s). The PD controller, in example embodiments, may be substantially dedicated to image capture and processing (e.g., PD and AF). In other example embodiments, the PD controller may be one or more general purpose processor(s) that may also have functions other than image capture and processing. For example, a main processor of a smartphone may perform the functions of the PD controller, as described herein. The PD controller may be configured to determine that an image is to be captured, such as based at least in part on user input(s) to a user device on which the PD module is disposed. The PD module may be further configured to obtain an PD image signal and/or image file corresponding to an image captured by the PD image sensor module. The PD image signal and/or PD image file may provide imaging parameters (e.g., intensity) for a plurality of pixels, where each pixel represent a corresponding respective areal segment of a scene that is imaged by the PD image sensor in the PD image corresponding to the PD image signal. The number of pixels represented in the PD image signal and the aspect ratio (e.g., ratio of horizontal pixels to vertical pixels) of the collection of pixels, or frame of the PD image, may be based at least in part on the layout of the photosensitive elements of the PD image sensor. The PD image corresponding to the PD image signal, in some cases, may not be in focus. In other words, the point of focus of a particular object from the scene imaged in the PD image may not lie on the imaging plane (e.g., within a depth of focus (DOF) of the photosensitive pixel elements of the PD image sensor).

Based at least in part on the PD image signal, the PD controller may be configured to determine one or more parameters corresponding to a particular object in the scene imaged in the PD image captured by the PD image sensor. These one or more parameters may be utilized to bring the particular object into focus prior to image capture of the scene including the particular object by the image capture module.

In example embodiments, the image capture module may include a primary image sensor. This primary image sensor may be any suitable type, such as CMOS or CCD image sensor devices. The image capture module may further include one or more optical elements, such as one or more lenses arranged as a lens assembly, one or more optical filters disposed on the primary image sensor, and an electromechanical device, such as a voice coil motor (VCM) or a piezomotor. In example embodiments, the electromechanical device may be mechanically attached to the primary image sensor lens assembly and may be controlled, such as by the PD module, to move the lens assembly relative to the primary image sensor of the image capture module. In this way, the nodal distance of the image capture module, or in other words, the distance between the node of the lens assembly to the imaging plane, where the primary image sensor is located, may be controlled. As a result, the PD module may be configured to control the location of the lens assembly of the image capture module relative to the primary image sensor by moving the lens assembly to the focus point, or at least within a depth of focus (DOF) of the focus point, in the image capture module. Therefore, at this relative location of the primary image sensor relative to the lens assembly of the image capture module, as controlled by the PD controller, an image captured of the scene by the image capture module may result in an object of the scene being in focus. It will be appreciated that in example embodiments, the PD module may control the movement of the primary image sensor, rather than the lens assembly, to place the primary image sensor at the focus point of the lens assembly of the image capture module. In these example embodiments, the primary image sensor, rather than the lens assembly, may be mechanically coupled to the electromechanical device and movable by the electromechanical device.

In example embodiments, the focus point of the particular object, such as a person's face, to be focused in the scene to be imaged may be determined by a phase detect (PD) technique performed by the PD controller on the PD image signal received from the PD image sensor module. By performing PD, the PD controller may be configured to determine the focus point corresponding to the particular object for the lens of the PD image sensor module. The PD mechanism allows for relatively fast determination of both the direction and the distance of the focus point relative to the imaging plane. It should be noted that light rays reflected off of the particular object that enter through the lens of the PD module will be converging until reaching the focus point or focus plane and diverging beyond the focus point. Therefore, the direction of focus point or focus plane relative to the imaging plane (e.g., location of the PD image sensor) in the PD image sensor module may be determined by determining if the incoming rays are diverging or converging. Furthermore, the distance of the focus point (or focus plane) relative to the imaging plane (e.g., location of the PD image sensor) in the PD image sensor module may be determined by determining the phase difference between the image of the object captured on different clusters of photosensitive pixels of the PD image sensor.

The PD controller, in example embodiments, may be configured to utilize the determination of the focus point or focus plane corresponding to the particular object in the PD image sensor module to determine a focus point or focus plane in the image capture module. In other words, the PD controller may be configured to determine the focus point (e.g., the point in the image sensor module where the particular object is to come into focus). This may be determined by the PD controller by identifying a variety of characteristics of the optical elements (e.g., lens) of the image capture module. These identified characteristics may include, for example, the nodal point and/or the focal length or focal point of the optical elements of the image capture module. If the focal point (e.g., the point where parallel incoming light rays converge) of the image capture module is known relative to the focal point of the AF capture image sensor module, then the focus point or focus plane of the image capture module may be determined. Furthermore, if the focus point or focus plane of the particular object for the optical elements of the image capture module is known and the location of the primary image sensor is further known, then the displacement needed to place the primary image sensor at, or within a DOF of, the focus plane may be determined. Therefore, the PD controller may be configured to derive the magnitude and direction of movement (e.g., predefined discrete steps, millimeters, etc.), or focus offset distance, that the primary image sensor is to be moved in the image capture module to acquire an image of the scene with the particular object in focus. The focus offset distance, as used hereinafter, is the distance (e.g., negative or positive value) between the derived focus plane of the particular object in the image capture module and the current position of the primary image sensor. The image capture module may be moved by controlling the electromechanical device, such as a VCM, to which the primary image sensor is mechanically coupled.

The PD controller, according to example embodiments, may further be configured to generate an image capture control signal based at least in part on the focus offset needed to produce a relatively focused image of the particular object in the scene to be imaged by the image capture module. The image capture control signal may be based at least in part on the direction and magnitude of the desired focus offset. In particular, the image capture control signal may be used to control the electromechanical device to move the primary image sensor back or forth (e.g., further or closer to the lens) to place the primary image sensor at approximately the focus plane of the image capture module, as derived by the PD controller. In some example embodiments, the image capture control signal may be an analog drive signal provided to the electromechanical device to power and/or control the electromechanical device to obtain a movement substantially equal to the desired focus offset and to place the primary image sensor approximately at the focus plane of the image capture module. For example, a DC voltage or current that corresponds to the magnitude of displacement of a VCM may be provided to the VCM-type electromechanical device on which the primary image sensor is disposed. The DC voltage, in example embodiments, may be provided by a digital-to-analog (DAC) component of the PD controller. In example embodiments, the image capture control signal may be determined by the PD module from a look-up table, such as a look-up that provides values (e.g., magnitude, frequency, phase, etc.) of image capture control signals corresponding to various desired focus offset distance. In other example embodiments, the image capture control signal may be determined by the PD module from one or more analytical models and/or equations to derive values (e.g., magnitude, frequency, phase, etc.) of image capture control signals corresponding to a desired focus offset distance.

In some example embodiments, the imaging system, including the PD module and the image capture module, as described herein, may further have a feedback loop from the image capture module to the PD module. This feedback loop may provide the PD controller with information from the image capture module about where the primary image sensor is located relative to the image capture module lens. This information may be transmitted by one or more sensors of the image capture module. For example, this information may be provided by a hall sensor and/or a piezo-sensor of the image capture module. The feedback signal received by the PD controller from the image capture module may be used by the PD controller to determine if the primary image sensor is within a spatial threshold of its intended location as determined by the PD controller. This spatial threshold, in example embodiments, may be a fixed threshold value, such as for example a predetermined number of micrometers. In some example embodiments, the spatial threshold may be approximately equal to the depth of focus (DOF), or some fraction or multiple thereof. In other example embodiments, the spatial threshold may be a percentage of the total movement of the lens assembly effected by the electromechanical device. In some cases, one or more forces (e.g., gravity) may influence the electromechanical device and/or primary image sensor such that the primary image sensor has not been displaced by the focus offset distance and, therefore, is not at its intended location. In this case, the PD controller may be configured to modify the image capture control signal, either up or down, to bring the primary image sensor to within a spatial threshold of the focus point.

In some example embodiments, the PD controller may direct the capture of an AF image signal and determine that the AF image may have been captured in a low light condition. This AF image, therefore, may not provide enough information to perform a PD that is likely to produce an accurate and precise determination of the focus point of the AF lens of the PD module. In this case, the PD controller may direct the illumination by an illuminator (e.g., light emitting diode (LED), light bulb, etc.) of the object and/or scene to be imaged using an illuminator. While the scene is illuminated, the PD controller may direct the acquisition of another AF image signal corresponding to an AF image. This new AF image signal may provide enough information to perform a PD for the purpose of identifying the focus point of the AF lens for the object to be imaged.

In example embodiments, the illumination by the illuminator may include visible light (e.g., approximately 380 nm to 750 nm) and/or near-infrared light (NIR) light (e.g., approximately 750 nm to 1125 nm). The PD image sensor may also be configured to be sensitive to some wavelengths in the visible wavelengths and the NIR wavelengths. In some cases, the PD image sensor may not have an NIR filter disposed thereon. As a result, the PD image sensor may be configured to capture light in the NIR range. By capturing a relatively wide spectrum of light to perform PD, the PD image sensor may be configured to capture the requisite level of light, even at relatively low light conditions (e.g., night time, low indoor light, etc.).

The PD module may still further, in some example embodiments, be configured to provide a depth map that may be appended to an image file, such as in metadata. This depth map may be generated based at least in part on the AF image acquired by the PD image sensor, as directed by the PD controller. The depth may include the depth of various pixels in the image space, corresponding to various areal segments in the object space of the scene that is imaged. This depth map may be generated by the PD module based on the AF image. In example embodiments, the phased difference (PD) corresponding to areal segments of the scene may be used to find a depth corresponding to each of the areal segments. This depth corresponding to the areal segments of the scene may be determined and appended to the image file, in any suitable manner, such as metadata.

The image capture module may further include an optical image stabilizer (OIS). This OIS may be communicatively coupled to one or more sensors, such as a gyroscope and/or micro-electromechanical system (MEMS) accelerometer. The OIS may be configured to stabilize the primary image sensor or the image capture lens using actuators in a manner so that the effects of vibration of the imaging system may be mitigated at least in part. The PD module may be configured to provide the OIS with additional information, beyond the information provided by the sensors, to enable the OIS to provide a stabilized image. For example, the PD module may be able to provide the OIS with information about movement from one frame to another and this information may be used by the OIS to predict movement of the imaging system relative to the object and move the primary image sensor and/or image capture lens to reduce the effects of the detected movement.

The discussion above may be understood with reference to FIG. 1. FIG. 1 is a schematic diagram that illustrates an example environment 100 where an autofocus (AF) module 110 provides one or more parameters and/or control signals (z) 130 to an image capture module 140 for capturing an image 150, in accordance with example embodiments of the disclosure. As indicated, the PD module 110 may be configured to acquire an AF image 120. The PD module 110 may include an optical element (e.g., lens) and an image sensor that have a fixed distance from each other. As a result, one or more objects in the AF image 120 may not be in focus. Indeed, depending on the distance from the PD module 110 of object(s) to be imaged, the AF image 120 may or may not be in focus.

The captured AF image 120 may be used by the PD module to determine a focus point of one or more objects in the PD image 120. A phase difference detected on the PD image sensor may be used to determine the focus point of the PD module. The defocus of the PD image 120 detected at the PD image sensor of the PD module 110 may be used by the PD controller to determine a phase difference. In some example embodiments, this determined phase difference may be used to identify a corresponding focus point at the image capture module, such as from a look-up table that relates the phase difference to a focus point of the image capture module. In other example embodiments, the phase difference, along with knowledge of the fixed distance between the PD lens assembly to the PD image sensor may be used to determine the focus point at the PD module 110. This focus point at the PD module may be may be used to determine the distance of the object that is to be focused in the captured image 150. This object distance may be determined based at least in part on the focal length of the PD lens assembly. After determining the object distance on the object side of the lens, the object distance may be used to determine the focus point of the image capture module 140 and the image capture lens therein. This focus point of the image capture module may be determined by knowing the focal length of the image capture module lens and the object distance as determined by the PD module. Once the focus point of the image capture module is determined, the difference between the current location of the primary image sensor and the image capture lens focus module may be determined and a control signal 130 may be produced to move the primary image sensor to the focus point in the image capture module 140.

This determined control signal, when provided to the image capture module 140 by the PD module, enables the electromechanical device, such as a VCM, in the image capture module 140 to drive the lens assembly of the image capture module such that the focus point of the lens assembly lies on the photosensitive pixels of the primary image sensor of the image capture module. At this point, the object to be imaged may be in focus and the image 150 may be captured by the image capture module 140. Alternatively, the primary image sensor may be mechanically coupled to the electromechanical device and may be movable. In these embodiments, the control signals may control the movement of the primary image sensor to place the primary image sensor at the focus point of the lens assembly of the image capture module 140.

It will be appreciated that the systems and methods as disclosed herein may not rely on a sweep through a range of distances between the image capture lens and the primary image sensor or sweeping through a range of focal lengths of the image capture lens. These sweep techniques may take a greater amount of time than the PD techniques, as described herein. Additionally, it should be noted that in the systems and methods as described herein, a dedicated PD module 110, with its own PD image sensor, separate from the primary image sensor of the image capture module, may be used for the purposes of implementing PD-based AF. Therefore, in the image capture module 140, photosensitive pixels of the primary image sensor may not be dedicated for performing PD technique on the image to be captured. Therefore, substantially all of the pixels, in example embodiments, of the capture image module may be used for the purposes of capturing the image 150. As a result, in these embodiments, additional image processing techniques, some of which may be processing bandwidth intensive and/or relatively slow, may not be needed to separate PD-dedicated pixels from the imaging-dedicated pixels of the primary image sensor. The implementation of the PD module 110 in directly driving the lens assembly such that its focus point lies on the primary image sensor may be relatively quick, and thereby result in a relatively enjoyable user experience with the imaging systems and methods, as described herein.

It will also be appreciated that by having the PD module 110 separated from the image capture module 140, the PD module 110, and the PD image sensor therein may be optimized for the purposes of AF, while the image capture module 140, and the primary image sensor may be optimized for the purposes of image capture. For example, a high pixel-count (e.g., small pixel size) image sensor may be utilized in the image capture module 140 to produce sharp images. The PD image sensor, on the other hand, may be a relatively lower pixel count image sensor with larger pixel sizes and masked pixels to perform PD. As a result of the larger photosensitive pixels of the PD image sensor, light may be captured relatively quickly, even in relatively low light conditions, for the purposes of PD. Therefore, a relatively lower pixel count PD image sensor, with relatively larger size pixels, may enable a relatively fast PD and AF control signal determination. Furthermore, in example embodiments, the PD image sensor may not have an IR filter and/or a color filter disposed thereon. As a result, a relatively large spectrum of light may be used for the purposes of PD by the PD module 110.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

Figure 2:
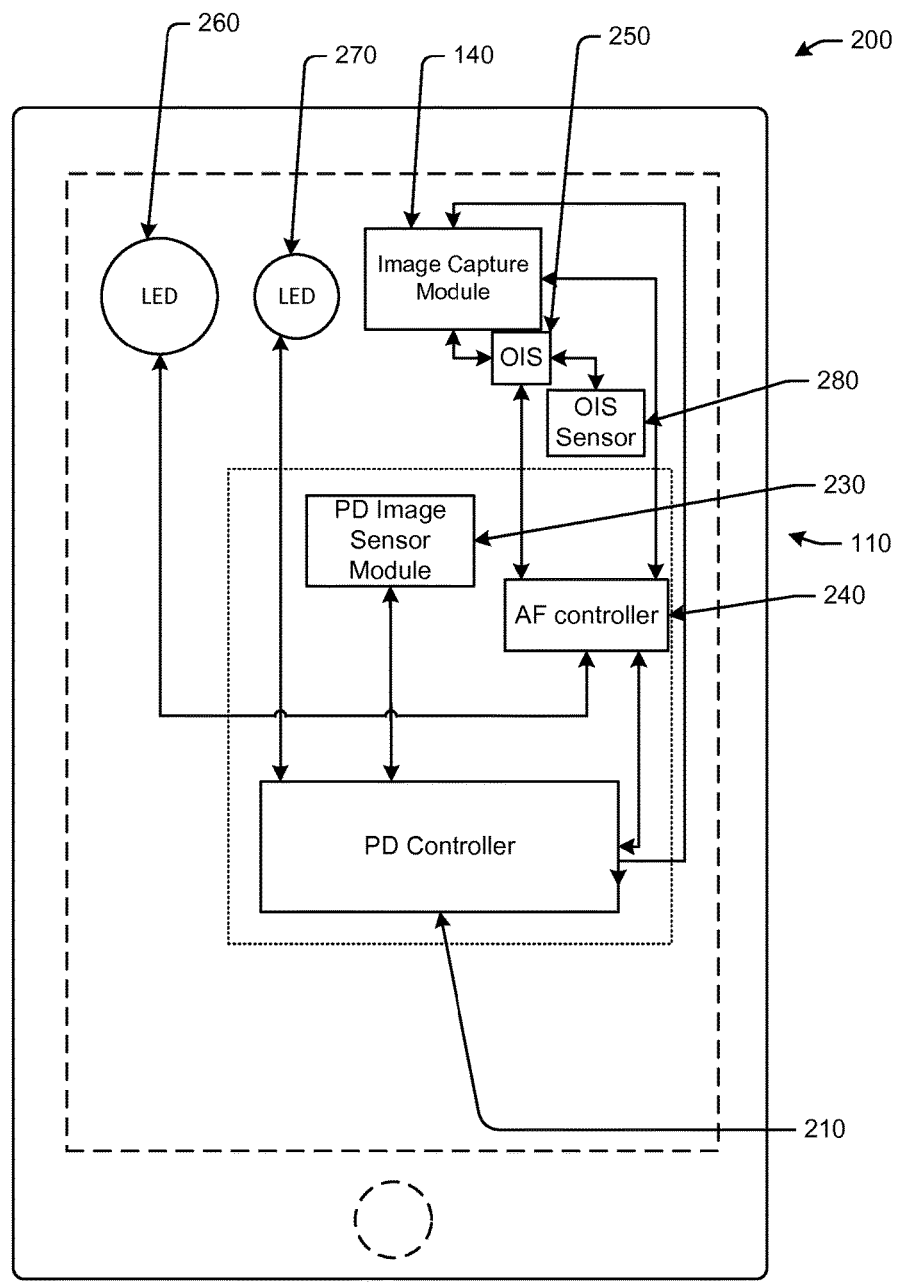
FIG. 2 is a schematic diagram of an example user device including the PD module and the image capture module of FIG. 1, in accordance with example embodiments of the disclosure.

FIG. 2 is a schematic diagram of an example user device 200 including the phase detect module 110 and the image capture module 140 of FIG. 1, in accordance with example embodiments of the disclosure. The user device may be any suitable user device 200 or imaging system that may be used to capture an image. The user device 200, while depicted as a smartphone, may be one of any variety of client devices, electronic devices, communications devices, mobile devices, and/or imaging systems with image capture capability. The user device 200 may include, but is not limited to, tablet computing devices, electronic book (ebook) readers, netbook computers, notebook computers, laptop computers, desktop computers, personal digital assistants (PDA), smart phones, web-enabled televisions, video game consoles, set top boxes (STB), smartphones, smart appliances, wearable devices, cameras, combinations thereof, or the like.

The user device 200 may include the PD module 110 and the image capture module 140. As depicted in FIG. 2 and discussed above, the PD module 110, in example embodiments, may include a PD image sensor module 230, a PD controller 210, and a PD controller 240. The PD image sensor module 230 may be configured to capture a PD image and provide an PD image signal to the PD controller 210. The PD controller 210 may be configured to direct the PD image sensor module 230 to capture the PD image. In example embodiments, the PD controller 210 may be configured to receive an indication that an image is to be captured, such as from a user input or from another entity, such as one or more application processor(s) of the user device 200. In some example embodiments, the PD controller 210 may be the same processor(s) as the application and/or main processor(s) of the user device 200. In other example embodiments, the PD controller 210 may be one or more dedicated PD and/or AF processor(s). In other words, in some example embodiments, the PD controller 210 may be configured to control one or more imaging or non-imaging functions of the user device 200.

Upon receiving an indication that an image is to be captured, the PD controller 210 may be configured to direct capture of the PD image 120. The PD controller 210 may further be configured to provide a focus offset to focus the image capture module 140 by analyzing a received PD image signal. The PD controller 210 may be configured to provide the focus offset information to an AF controller 240. The AF controller 240 may be configured to determine the control signals 130 to focus the image capture module 140. In some example embodiments, the functions of the AF controller 240 may be performed by the PD controller 210. In example embodiments, the PD controller 210 may be configured to identify a low light condition of an image captured by the PD image sensor. Such an image, in example embodiments, may lack an intensity dynamic range or a sufficient signal to noise ratio (SNR) to enable the determination of the control signal 130. If the range of intensities of the pixels of the PD image is not sufficiently great (e.g., the difference between the dimmest pixels and brightest pixels do not span a sufficiently large intensity range), then it may be difficult to make a reliable PD determination. In other words, to distinguish features (e.g., images of an object) in a PD image, the intensity dynamic range must be sufficiently large so that the SNR is sufficiently large to recognize features in the PD image and determine PD values therefrom. The PD controller 210 may be configured to determine if the intensity range or contrast of the image meets a minimum threshold value. In this case, the PD controller 210 may be configured to direct the illumination of the scene to be imaged for the purposes of capturing the PD image 120. Directing the illumination of the scene may entail directing an illuminator, such as light emitting diode (LED) 260 to emit light. In example embodiments, the LED 260 may be configured to provide light in the near-ultraviolet, visible, and/or IR spectrum.

The image capture module 140 may be configured to receive a control signal from the PD module 110. The received control signal may be used to displace the lens assembly of the image capture module 140 so that the focus point of the object to be imaged lies on the primary image sensor of the image capture module 140. In example embodiments, the capture of the image 150 may be directed by the PD controller 210 and/or other processor(s) of the user device 200, or any other suitable controller. In some example embodiments, the capture of the image 150 by the image capture module 140 may be performed in relatively low-light conditions. In these example embodiments, the image capture module 140 may be configured to acquire the image 150 with an illumination of the scene to be imaged. This illumination may be performed using an illuminator, such as LED 270. The LED 270, in example embodiments, may be configured to illuminate the scene to be imaged using primarily light in the visible spectrum. In example embodiments, the PD controller 210, or other suitable entities, such as an application processor of the user device 200 may be configured to direct the LED 270 to illuminate the scene to be imaged when the image capture module 140 is to capture the image 150.

In example embodiments, the user device 200 may optionally include an optical image stabilizer (OIS) 250 that may be configured to receive sensor signals from one or more sensor(s) 280, such as a gyroscope and/or accelerometer. These sensor signals may be used by the OIS 250 to reduce the effects of vibration of the user device 200 while capturing the image 150. In some example embodiments, the OIS 250 may be configured to receive one or more user device 200 movement information from the PD module 110 for reducing the effects of vibration of the user device 200 while image 150 is captured. In some example embodiments, the OIS 250 may be configured to identify movement of the user device 200 based on consecutive frames or images received from the PD module 130. The OIS 250 may be configured to identify a set of spatial coordinates for each received frame of a scene from the PD module 110. The OIS 250 may be configured to determine how to move the lens assembly and/or the primary image sensor of the image capture module based at least in part on these determined coordinates based at least in part on the received images from the PD module 110 in addition to gyroscope data to reduce blur due to user device 200 vibration.

Figure 3:
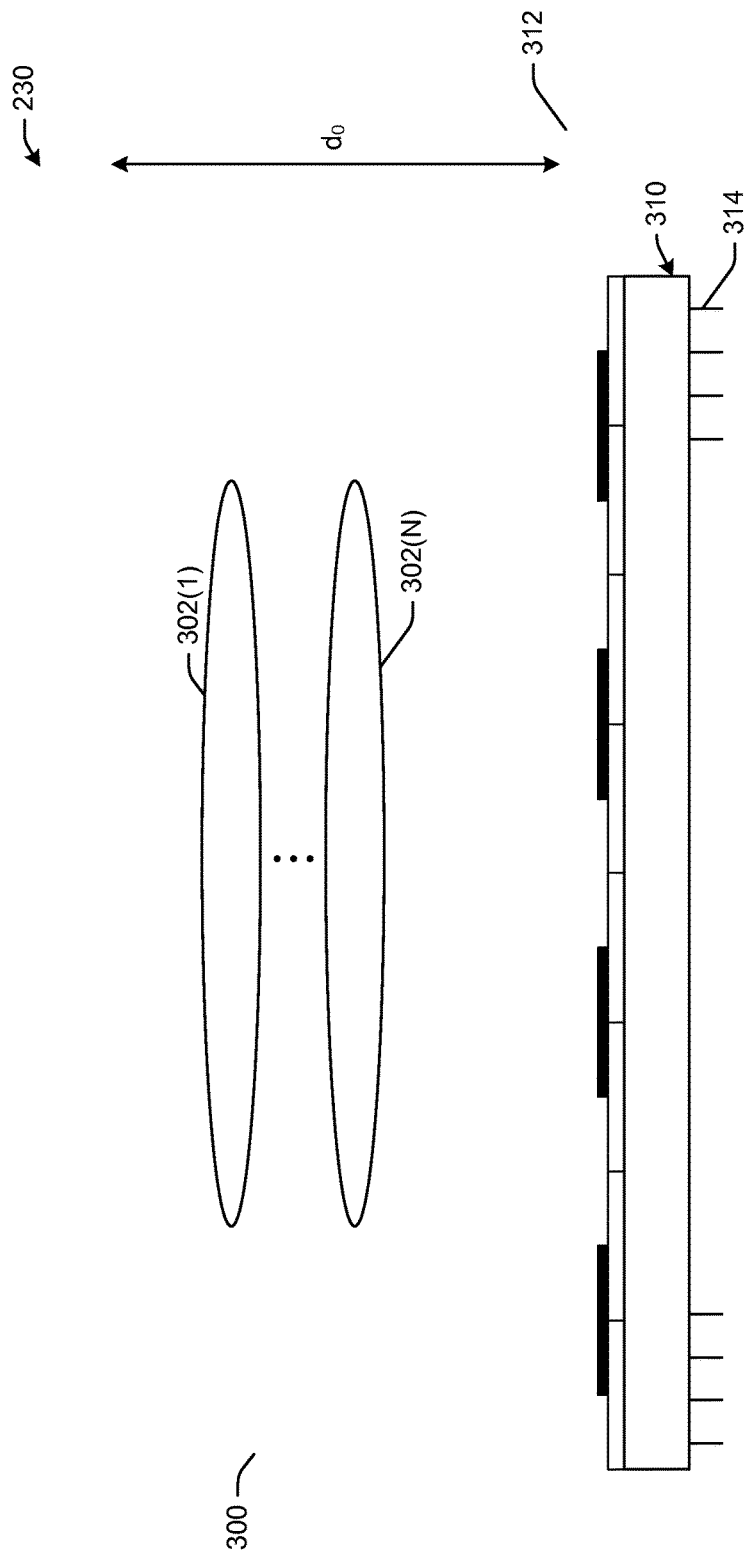
FIG. 3 is a side view schematic diagram of an example PD image sensor module, in accordance with example embodiments of the disclosure.

FIG. 3 is a side view schematic diagram of an example phase detect (PD) image sensor module 230, in accordance with example embodiments of the disclosure. The PD image sensor module 230 may include a PD lens assembly 300 that may include one or more optical elements 302(1), . . . , 302(N), such as lenses. The PD image sensor module 230 may further include a PD image sensor 310, with a plurality of photosensitive pixels 312 and a plurality of masking elements 314 that block impinging light from a portion of the photosensitive pixels 312. As discussed above, in example embodiments, the photosensitive pixels 312 of the PD image sensor 310 may be located at a fixed distance ($d_o$) from the PD lens assembly 300 of the PD image sensor module 230. Therefore, in some cases, if $d_o$ does not correspond to the focus point of a particular object to be imaged, then the PD image 120 captured by the PD image sensor 310 may not be focused. The PD image sensor 310 may further include one or more signal contacts 316 from which captured image signals may be provided to other entities, such as the PD controller 210. Although the signal contacts 316 are depicted at the bottom of the image sensor 310 as pins, the signal contacts 316 may be of any suitable types and/or configurations.

Although two PD lenses 302(1), 302(N) are depicted, it will be understood that there may be any number of optical elements, including one lens or more than two lenses and/or mirrors. In some example embodiments, the lens assembly 300 may be disposed on a casing or a transparent plate of the user device 200.

The PD image sensor 310 may be any known device that converts an optical image or optical input to a corresponding electronic signal. The PD image sensor 310 may further be of any suitable photosensitive pixel 312 count and aspect ratio. Further still, the PD image sensor 310 may be sensitive to any frequency of radiation, including infrared and near infrared (NIR), visible, and/or near-ultraviolet (UV). In certain example user devices 200, the PD image sensor 310 may be a silicon (Si) based image sensor, such as charge couple device (CCD) or complementary metal oxide semiconductor (CMOS) image sensor. The bandgap of Si, at $E_g=1.1$ electron volts (eV), corresponds to 1125 nanometers (nm) wavelength, which is within the near-infrared (NIR) spectral region. Therefore, the Si material of Si-based image sensors may be sensitive up to a wavelength of about 1125 nm. The spectral sensitivity of these Si-based image sensors may correspond to an optical wavelength range from about 350 nm to about 1125 nm. This may enable the acquisition of spectral information at the visible spectral range corresponding to wavelengths of about 380 nm to about 750 nm and the NIR spectral range corresponding to wavelengths of about 750 nm to about 1125 nm.

For most imaging applications, the spectral information associated with a visible range of wavelengths of about 380 nm to 780 nm is used to generate images. In high quality imaging applications, the capture of NIR spectral information may introduce haze, noise, or otherwise degrade the image in the visible spectral range. Therefore, Si-based image sensors often have NIR filters provided thereon to prevent the detection of radiation in the NIR frequency range for most applications. The NIR filters, by design, may filter out spectral information that may otherwise be captured by the Si-based image sensor. Furthermore, the NIR filters may introduce cost, such as processing and/or material cost during manufacture of the Si-based image sensors. However, for the purposes of determining a focus point, in example embodiments, the light from the full spectral sensitivity range of the PD image sensor 310 may be utilized by the PD controller 210. As a result, in example embodiments, the PD image sensor module 230 may not have any optical filters (e.g., IR or color filters) disposed thereon.

Figure 4:
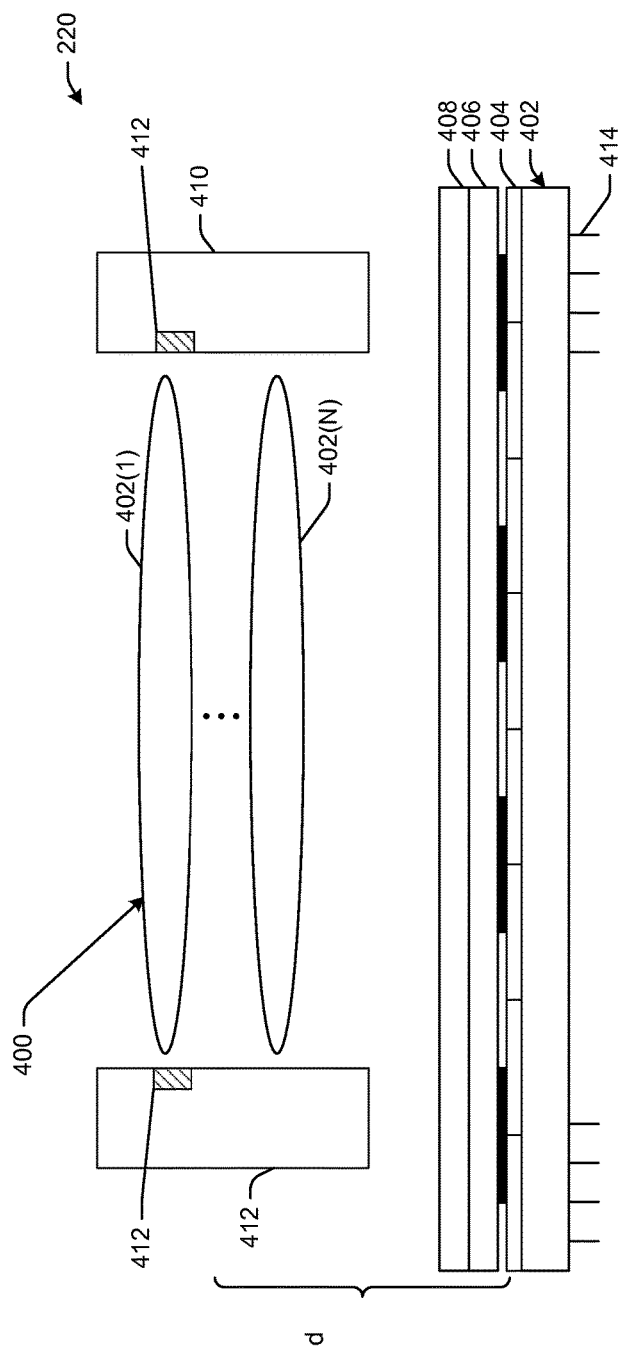
FIG. 4 is a side view schematic diagram of an example image capture module, in accordance with example embodiments of the disclosure.

FIG. 4 is a side view schematic diagram of an example image capture module 140, in accordance with example embodiments of the disclosure. The image capture module 140 may include an image capture lens assembly 400 with one or more optical elements 402(1), 402(N). The image capture module 140 may further include a primary image sensor 410, with a plurality of photosensitive pixels 412 disposed thereon. Although two image capture lenses 402(1), 402(N) are depicted, it will be understood that there may be any number of optical elements, including one or more than two lenses and/or mirrors. In some example embodiments, the image capture lens assembly 400 may be disposed on a casing or a transparent plate of the user device 200.

In example embodiments, the primary image sensor 410 may be of any suitable type (e.g., CCD, CMOS, Active Pixel substrate, etc.), pixel count, and/or pixel aspect ratio. In example embodiments, the primary image sensor 410 may have a greater pixel count than the PD image sensor 310. In example embodiments, the primary image sensor 410 may have smaller area photosensitive pixels 412 than the photosensitive pixels 312 of the PD image sensor 310. The primary image sensor 410 may be sensitive to any frequency of radiation, including IR, NIR, visible, and/or near-ultraviolet (UV). As photons impinge on the photosensitive pixels 412 of the primary image sensor 410, such as photons reflected off of objects in a scene to be imaged, electron-hole pairs may be formed, thereby indicating the optical radiation flux. The primary image sensor 410 may have a color filter array 418, such as a Bayer color filter or a Foveon vertical filter, disposed thereon. The primary image sensor 410 may still further have an IR filter 420 disposed thereon.

As discussed above, in example embodiments, the photosensitive elements 412 of the primary image sensor 410 may be located at a variable distance (d) from the image capture lens assembly 400 of the image capture module 140. The lens assembly 400 may be mechanically coupled and movable by an electromechanical device 430. The electromechanical device 430 may be configured to move the lens assembly 400 relative to the primary image sensor 410. The electromechanical device 430 may be configured to receive a control signal 130, such as from PD controller 210 or the AF controller 240 that may direct the electromechanical device 410 to displace the lens assembly 400 by a focus offset distance, as determined by the PD controller 210. In example embodiments, the electromechanical device 430 may be a voice coil motor (VCM). In these example embodiments, the VCM control signal may be a DC voltage or current received from the AF controller 240 to displace the lens assembly 400 by the focus offset distance so that the focus point of an object to be imaged by the image capture module 140 lies on the photosensitive elements 412 of the primary image sensor. In other example embodiments, the electromechanical device 430 may be a piezomotor or other suitable displacement device that may be used to displace the lens assembly 400 relative to the primary image sensor 410. In some alternative example embodiments, the electromechanical device 430 may be configured to displace the primary image sensor 410 relative to the lens assembly 400. In this case, the electromechanical device may be configured to displace the primary image sensor 410 by the offset distance, according to received AF control signals from the PD module 110, so that the image sensor is at the focus point of an object of the scene to be imaged.

The image capture module 140 may further have one or more displacement sensors 432. The displacement sensor 432 may be configured to provide a signal that indicates the position of the electromechanical device 430 and/or the lens assembly 400. The displacement sensor 432 may be configured to provide a feedback mechanism by providing its signal to the PD controller 240 and/or the AF controller 240. The displacement sensor signal may be used by the AF controller 240 and/or PD controller 210 to adjust a control signal of the electromechanical device 430 if the electromechanical device 430 does not displace the primary image sensor 410 by a target amount. The target amount may not be achieved if the electromechanical device 430 is influenced by one or more forces, such as gravity. For example, if the electromechanical device 430 is a VCM, the physical orientation of the user device 200 relative to the ground may change the influence of gravity on the VCM and, therefore, a feedback mechanism utilizing the displacement sensor signals may be used to tune the displacement (d) of the lens assembly 400 to the desired focus offset distance. In example embodiments, the displacement sensor 432 may be a hall sensor. In other example embodiments, the displacement sensor 432 may be a piezoresistive sensor or any other suitable type of sensor that can be used to measure the displacement of the lens assembly 400.

The image capture module 140 may further include one or more signal contacts 416 from which captured image signals may be provided to other entities, such as the PD controller 210 or other processor(s), such as an application processor of the user device 200. The signal contacts 416 may also serve, in example embodiments, as an electrical conduit to receive the electromechanical device control signal 130 and/or provide the displacement sensor 432 signal. Although the signal contacts 416 are depicted at the bottom of the primary image sensor 410 as pins, the signal contacts 416 may be of any suitable types and/or configurations.

FIG. 5A is a schematic diagram that illustrates an example object 500 image detection by the phase detect (PD) module 110, in accordance with example embodiments of the disclosure. Rays of light 502, 504 may be reflected off of the object 500 and collected by the PD lens assembly 300, depicted herein as a single lens element. The rays 502, 504, after passing through the PD lens assembly 300 may be incident upon the plurality of photosensitive pixels 312 of the PD image sensor 310. Ray 502, in this case, may be incident on the non-masked portion of a first pixel and ray 504 may be incident on a non-exposed portion of a second pixel. Although, the rays 502, 504 are shown as being incident on adjacent pixels 312, in example embodiments, the rays 502, 504 may be incident on non-adjacent pixels 312. As shown here, the distance ($d_o$) between the PD lens assembly 300 and the PD image sensor 310 may be fixed. The rays 502, 504 do not converge to the same spot on the PD image sensor 310 and this is detected by the masked pixels 312.

The optical intensity profile 506 resulting from ray 502 does not overly the optical intensity profile 508 resulting from ray 504. The PD image generated, in this case, may be out of focus. The PD controller 210, upon receiving the PD image signal resulting from this example, may be configured to determine that the phase difference (e.g. microns, number of pixels, etc.) between the intensity profile 506 and intensity profile 508. This phase difference may be determined by which of the pixels 312 detect the rays 502, 504, respectively. The PD controller 210 may further be configured to determine that the rays 502, 504 are converging, rather than diverging, at the photosensitive pixels 312 of the image sensor 310 and, therefore the focus point of the object 500 may be beyond $d_o$ distance from the AF lens 300. This may be determined based at least in part on the relative orientation of the masking elements 314 of the pixels 312 where the rays 502, 504 are detected. In example embodiments, the PD controller 210 may be configured to determine the distance by which the optical intensity profiles 506 and 508 are separated (e.g., phase difference). Based at least in part on this phase difference, the PD controller 240 may be configured to determine the focus point of the image capture module 140 for the object 500. In some example embodiments, the focus point of the image capture module 140 may be determined using a look-up table that relates a determined phase difference to a focus point of the image capture module 140. This determination may, in example embodiments involve interpolating and/or extrapolating data provided in the look-up table, particularly if the data relating phase difference to focus point of the image capture module is relatively sparse. In other example embodiments, the PD controller 210, may be configured to analytically determine the focus point of the PD module 110 and, based on the focus point of the PD module 110, determine the focus point of the image capture module 140.

FIG. 5B is a schematic diagram that illustrates another example object 510 image detection by the PD module 110, in accordance with example embodiments of the disclosure. Rays of light 512, 514 may be reflected off of the object 510 and collected by the PD lens assembly 300. The rays 512, 514, after passing through the PD lens assembly 300 may be incident upon the plurality of photosensitive pixels 312 of the PD image sensor 310. As shown here, the distance ($d_o$) between the AF lens assembly 300 and the PD image sensor 310 may be fixed. The rays 512, 514 do not converge to the same spot on the PD image sensor 310. As a result, the optical intensity profile 516 resulting from ray 512 does not overly the optical intensity profile 518 resulting from ray 514. The PD image generated, in this case, may be out of focus. The PD controller 210, upon receiving the PD image signal resulting from this example, may be configured to determine the phase difference (e.g. microns, number of pixels, etc.) between the intensity profile 506 and intensity profile 508. This phase difference may be determined by which of the pixels 312 detect the rays 502, 504, respectively. The PD controller 210 may further be configured to determine that the rays 512, 514 are diverging, rather than converging, at the photosensitive pixels 312 of the image sensor 310 and, therefore the focus point of the object 500 may be less than $d_o$ distance from the AF lens 300. This may be determined based at least in part on the relative orientation of the masking elements 314 of the pixels 312 where the rays 502, 504 are detected. The PD controller 210 may further be configured to determine the distance by which the optical intensity profiles 516 and 518 are separated (e.g., phase difference). Based at least in part on this phase difference, the PD controller 240 may be configured to determine the focus point of the image capture module 140 for object 510.

FIG. 5C is a schematic diagram that illustrates yet another example object 520 image detection by the PD module 110, in accordance with example embodiments of the disclosure. Rays of light 522, 524 may be reflected off of the object 520 and collected by the PD lens assembly 300. The rays 522, 524, after passing through the PD lens assembly 300 may be incident upon the plurality of photosensitive pixels 312 of the PD image sensor 310. As shown here, the distance ($d_o$) between the PD lens assembly 300 and the PD image sensor 310 may be fixed. The rays 522, 524 converge to the same spot on the PD image sensor 310. As a result, the optical intensity profile 526 resulting from ray 522 substantially overlaps the optical intensity profile 528 resulting from ray 524. The PD image generated, in this case, may be in focus. The PD controller 240, upon receiving the PD image signal resulting from this example, may be configured to determine that the image of the object 520 is in focus and, accordingly, the focus point of the object 520 may be approximately $d_o$ away from the PD lens assembly 300 (e.g., the location of the photosensitive pixels 312 of the PD image sensor 310). Based at least in part on determining no- phase difference, the PD controller 210 may be configured to determine the focus point of the image capture module 140 for object 520.

Figure 6:
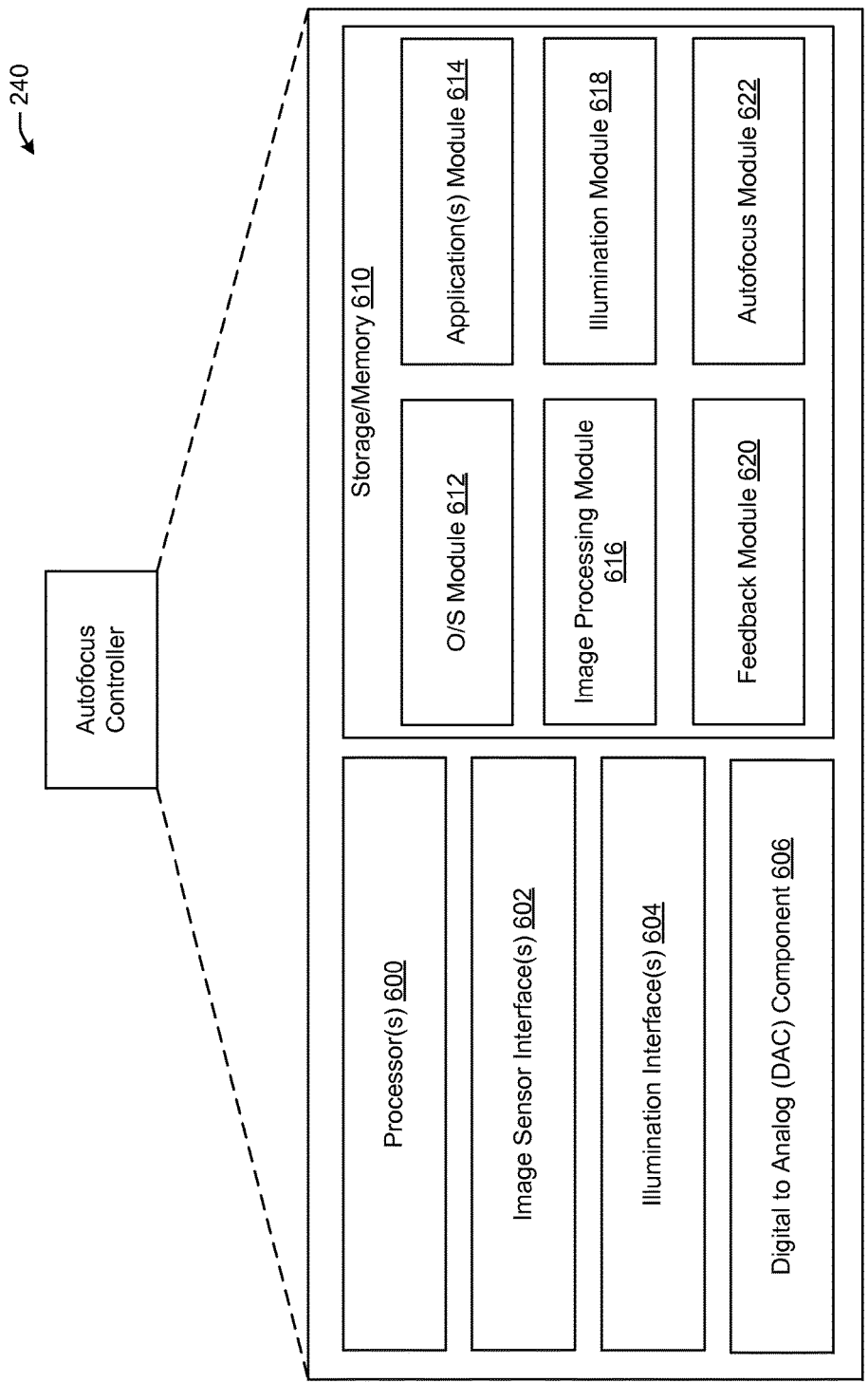
FIG. 6 is a block diagram of an example PD controller, in accordance with example embodiments of the disclosure.

FIG. 6 is a block diagram of an example PD controller 210, in accordance with example embodiments of the disclosure. The PD controller 210 may include one or more processor(s) 600, one or more image sensor interface(s) 602, one or more illumination interface(s) 604, a digital-to-analog (DAC) component 606, and one or more storage or memory 610.

In some examples, the processors 600 of the autofocus controller 240 may be implemented as appropriate in hardware, software, firmware, or combinations thereof. Software or firmware implementations of the PD controller 210 may include computer-executable or machine-executable instructions written in any suitable programming language to perform the various functions described. Hardware implementations of the processors 600 may be configured to execute computer-executable or machine-executable instructions to perform the various functions described. The one or more processors 600 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The PD controller 210 may also include a chipset (not shown) for controlling communications between the one or more processors 600 and one or more of the other components of the user device 200. The one or more processors 600 may also include one or more application specific integrated circuits (ASICs) or application specific standard products (ASSPs) for handling specific data processing functions or tasks.

The image sensor interfaces(s) 602 may allow the PD controller 210 to communicate with the PD image sensor 310 and/or the primary image sensor 410 to direct capture of an image. The image sensor interfaces(s) 602 may further enable receiving image sensor signal(s) from the PD image sensor 310 and/or the primary image sensor 410. The illumination interface(s) 604 may enable the PD controller 240 to direct illumination of a scene by turning on and/or off one or more of the LEDs 260, 270. The digital-to-analog (DAC) component 606 may enable the PD controller 240, which in example embodiments, may be included and/or implemented by the one or more processor(s) 600, to translate a digital control signal value to an analog control signal 130 to provide to the electromechanical device 430 of the image capture module 140.

The memory or storage 610 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The storage/memory 610 may store program instructions that are loadable and executable on the processor(s) 600, as well as data generated or received during the execution of these programs. Turning to the contents of the memory 610 in more detail, the memory 610 may include one or more operating systems (O/S) 612, an applications module 614, an image processing module 616, an illumination module 618, a feedback module 620, and a AF module 622. Each of the modules and/or software may provide functionality for the PD controller 210, when executed by the processors 600. The modules and/or the software may or may not correspond to physical locations and/or addresses in storage/memory 610. In other words, the contents of each of the modules 612, 614, 616, 618, 620, 622 may not be segregated from each other and may, in fact be stored in at least partially interleaved positions on the memory 610.

The O/S module 612 may have one or more operating systems stored thereon. The processors 200 may be configured to access and execute one or more operating systems stored in the (O/S) module 612 to operate the system functions of the device 200. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 614 may contain instructions and/or applications thereon that may be executed by the processors 600 to provide one or more services. These instructions and/or applications may, in certain aspects, interact with the (O/S) module 612 and/or other modules of the PD controller 210. The applications module 614 may have instructions, software, and/or code stored thereon that may be launched and/or executed by the processors 600 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof.

The instructions and/or functionality stored in the image processing module 616 may be executed by the processors 600 to provide a variety of functionality to the PD controller 210 pertaining to directing the acquisition of the PD image and processing the PD image. In example embodiments, the processor(s) 600 may be configured to identify that an image is to be acquired. This may be identified, in some example embodiments, by receiving a message indicating that an image is to be acquired, such as from application processor(s) of the user device 200, which, in example embodiments may include processor(s) 600. After identifying that an image is to be acquired, the PD controller 210 and the processor(s) 600 thereon may be configured to direct the PD image sensor 310 to acquire a PD image. The processor(s) 600 may further be configured to receive a PD image signal corresponding to the PD image acquisition directed by the processor(s) 600. This PD image may include the particular object that is to be imaged. The PD image signal may be received by the processor(s) 600 via one or more communicative links between the PD image sensor 310 and the processor(s) 600. After receiving the PD image sensor signal, the processor(s) 600 may be configured to identify a focus point of the particular object to be imaged from the PD image sensor signal. In particular, the processor(s) 600 may be configured to determine the level of defocus or phase difference of the particular object to be imaged, and based thereon, identify a focus point of the object to be imaged. In general, the greater the phase difference (e.g., micrometers, number of pixels, etc.), the further the focus point is from the current location of the PD image sensor 310. The processor(s) 600 may be configured, therefore, to analyze the defocus to determine a direction and a distance of the focus point of the particular object relative to the location of the PD image sensor 310. In some example embodiments, the relationship between the determined phase difference and the focus point relative to the location of the PD image sensor 310 may be stored in a look-up table. In these example embodiments, the processor(s) 600 may be configured to access the look-up table where PD-to-focus point relationships are stored, such as in storage/memory 610 or an external datastore, to determine the focus point of the object in the AF module 110. In other example embodiments, analytical equations/models may be used to determine the relationship between defocus and the focus point relative to the location of the PD image sensor 310.

In certain example embodiments, the illumination module 618 may have instructions stored thereon that may enable the processors 600 and the PD controller 210 to provide various functions associated with energizing and/or de-energizing the an illumination source, such as the LED 260. The processor(s) 600 may further be configured to direct the PD image sensor 310 to acquire a first PD image and may be configured to receive the first PD image signal corresponding to the acquired first PD image from the PD image sensor 310. In example embodiments, the processor(s) 600 may be configured to analyze the received first PD image signals and determine that the first PD image was taken under low-light conditions. Images acquired under low-light conditions may lack enough intensity range (e.g., contrast, sharpness, etc.) of the constituent pixels to enable determining a phase (e.g., defocus) of the particular object. In other words, a low-light condition may preclude the processor(s) 600 from performing a relatively accurate and/or precise PD technique. In example embodiments, the dynamic range of intensity and/or the SNR of the PD image taken under low-light conditions may be insufficient to produce a relatively accurate and/or precise phase difference assessment. As a result, the processor(s) 600 may further be configured, based at least in part on the determination of a low-light condition, to direct the illumination of the scene to be imaged via an illuminator, such as the LED 260. In example embodiments, the LED 260 may emit light that spans a spectral range that includes near-IR wavelengths (e.g., 750 nm-4000 nm). Upon illumination of the scene by turning on the LED 260, the processor(s) 600 may be configured to direct the acquisition of a second PD image by the PD image sensor 310. The processor(s) 600 may further be configured to receive the second PD image, as generated by the PD image sensor 310, responsive to the request for the second PD image by the processor(s) 600. The second PD image, as a result of being acquired while the scene to be imaged is illuminated by the LED 260, may not be in a low-light condition and may be usable by the processor(s) 600 for the purposes of determining a focus point, such as by the processes enabled by the image processing module 616.

In certain example embodiments, the feedback module 620 may have instructions stored thereon that may enable the processor(s) 600 and the PD controller 210 to provide various functions associated with receiving feedback from the image capture module 140. The feedback may be signals from displacement sensor 432 that provides information about the current location of the primary image sensor 410. The displacement sensor signals may be solicited and/or received by the processor(s) 600 from the displacement sensor 432. The processor(s) 600 may further be configured to determine the displacement (e.g., referenced to a particular starting location of the primary image sensor 410) and/or the location (e.g., referenced to location of other elements, such as the image capture lens assembly 400) of the primary image sensor 410 based at least in part on the received displacement sensor signals.

In example embodiments, where feedback displacement information (e.g., relative location from the starting location of the primary image sensor 410) is determined from the displacement sensor signals, the processor(s) 600 may be configured to compare the feedback displacement to the desired focus offset distance for bringing the object into focus. If the feedback displacement is not within a threshold of the focus offset distance, as determined by the processor(s) 600 for focusing the particular object, then the processor(s) 600 may be configured to generate an adjusted control signal. The adjusted control signal may be based at least in part on the feedback displacement, the focus offset distance, and initial control signal provided to the electromechanical device 430 of the image capture module 140. In example embodiments, where feedback focus distance (e.g., referenced to location of other elements, such as the image capture lens assembly 400) is determined from the displacement sensor signals, the processor(s) 600 may be configured to compare the feedback focus distance to the desired focus point of the image capture module 140 for bringing the object into focus. If the feedback focus distance is not within a threshold of the focus point, as determined by the processor(s) 600 for focusing the particular object, then the processor(s) 600 may be configured to generate an adjusted control signal. The adjusted control signal may be based at least in part on the feedback focus distance, the focus point for the image capture module, and initial control signal provided to the electromechanical device 430 of the image capture module 140.

In certain example embodiments, the AF module 622 may have instructions stored thereon that may enable the processor(s) 600 and the PD controller 210 to provide various functions associated with generating an (AF) control signal 130 to provide to the electromechanical device 430 of the image capture module 140. The processor(s) 600 may be configured to determine a focus point, or the distance from the image capture lens 400 to the point where the object to be imaged is in focus, of the image capture module 140, based at least in part on the phase difference determined from the PD image signal. In example embodiments, the ascertained phase difference may be used to find a corresponding focus point of the image capture module 140, such as from a look-up table. This phase difference may be used to determine a focus offset distance by subtracting the current distance between the lens assembly 400 and the primary image sensor 410 from the determined focus point, which represents the distance between the lens assembly 400 and the primary image sensor 410 where the desired focus is achieved. The processor(s) 600 may be configured to determine a focus point, or the distance from the image capture lens 400 to the point where the object to be imaged is in focus, of the image capture module 140, based at least in part on the focus point of the object for the PD module 110, as determined by the processes enabled by the image processing module 616. In some example embodiments, the focus point of the object for the image capture module 140 may be determined from a look-up table that maps the focus points of the PD module 110 with corresponding focus points of the image capture module 140.

In other example embodiments, analytical equations and/or models may be utilized to determine the focus point of the object to be imaged for the image capture lens 400 of the image capture module 140. For example, in some cases, the focus point of the image capture module 140 may be calculated by the following equation:

$$d_{IC}^{fp} = \left(\frac{1}{f_{IC}} - \frac{1}{f_{AF}} + \frac{1}{d_{AF}^{fp}}\right)^{-1}, \quad \text{(Equation 1)}$$

where $d_{IC}^{fp}$ is the focus point of the image capture lens 400, $d_{AF}^{fp}$ is the focus point of the AF lens 300, $f_{IC}$ is the focal length of the image capture lens 400, and $f_{AF}$ is the focal length of the AF lens 300.

It will be appreciated that in Equation 1, if the focal length of the PD lens 300 is equal to the focal length of the image capture lens assembly 400, then the focus point in the image capture module 140 may be the same distance away from the image capture lens assembly 400 as the focus point in the PD module 110 is away from the PD lens assembly 300.

After determining a focus point to bring the object into focus in the image capture module 140, the processor(s) 600 may be configured to determine the current location of the PD lens assembly 300. Based on the difference between the current location of the PD lens assembly 300 and the desired location of the PD lens assembly 300 for the desired focus point of the image capture module 140, a focus offset distance may be calculated. In example embodiments, the processor(s) may be configured to determine the focus offset distance by subtracting the current distance between the lens assembly 400 and the primary image sensor 410 from the determined focus point, which represents the distance between the lens assembly 400 and the primary image sensor 410 where the desired focus is achieved.

After determining the focus offset distance, the processor(s) 600 may be configured to determine a control signal corresponding to the focus offset distance, to be provided to the electromechanical device 430 of the image capture module 140 to move the lens assembly 400 so that the focus point of the image capture module 140 falls on the primary image sensor 410. In example embodiments, this process may be performed in cooperation with or by the AF controller 240. In example embodiments, the AF control signal may be determined by the processor(s) 600 from a look-up table, such as a look-up table that provides values (e.g., magnitude, frequency, phase, etc.) of AF control signals corresponding to various desired focus offset distances. The look-up table, in example embodiments, may be stored in the storage/memory 610 or an external datastore. In other example embodiments, the AF control signal may be determined by the processor(s) 600 from one or more analytical models and/or equations to derive values (e.g., magnitude, frequency, phase, etc.) of image capture control signals corresponding to the desired focus offset distance. In some example embodiments, the AF control signal may be an analog drive signal provided to the electromechanical device 430 to power and/or control the electromechanical device 430 in a manner to obtain a movement substantially equal to the desired focus offset distance to place the lens assembly 400 at a position so that the focus point of the image capture module 140 falls on the primary image sensor 410. For example, a DC voltage that corresponds to the magnitude of displacement of a VCM may be provided to a VCM-type electromechanical device 430 on which the lens assembly 400 is disposed. The DC voltage, in example embodiments, may be provided by the digital-to-analog (DAC) component 606 of the PD controller 210.

It will be appreciated that while the discussion herein is directed to moving the image control image sensor 410 to the focus point, as determined by the processor(s) 600, of the image capture module 140, in some example embodiments, the lens assembly 400 position may be fixed (e.g., the lens assembly 400 may not be configured to move). In these example embodiments, the electromechanical device 430 may be coupled to the primary image sensor 410 to move the primary image sensor such that focus of an object to be imaged is achieved.

It will be appreciated that there may be an overlap in the functionality of the instructions stored in the one or more operating systems (O/S) module 612, the applications module 614, the image processing module 616, the illumination module 618, the feedback module 620, and the PD (autofocus) module 622. In fact, the functions of the aforementioned modules 612, 614, 616, 618, 620, 622 may interact and cooperate seamlessly under the framework of the PD controller 240. Indeed, each of the functions described for any of the modules 612, 614, 616, 618, 620, 622 may be stored in any module 612, 614, 616, 618, 620, 622 in accordance with certain example embodiments of the disclosure. Further, in certain example embodiments, there may be one single module that includes the instructions, programs, and/or applications described within the operating systems (O/S) module 612, the applications module 614, the image processing module 616, the illumination module 618, the feedback module 620, and the PD (autofocus) module 622.

Illustrative Processes

Figure 7:
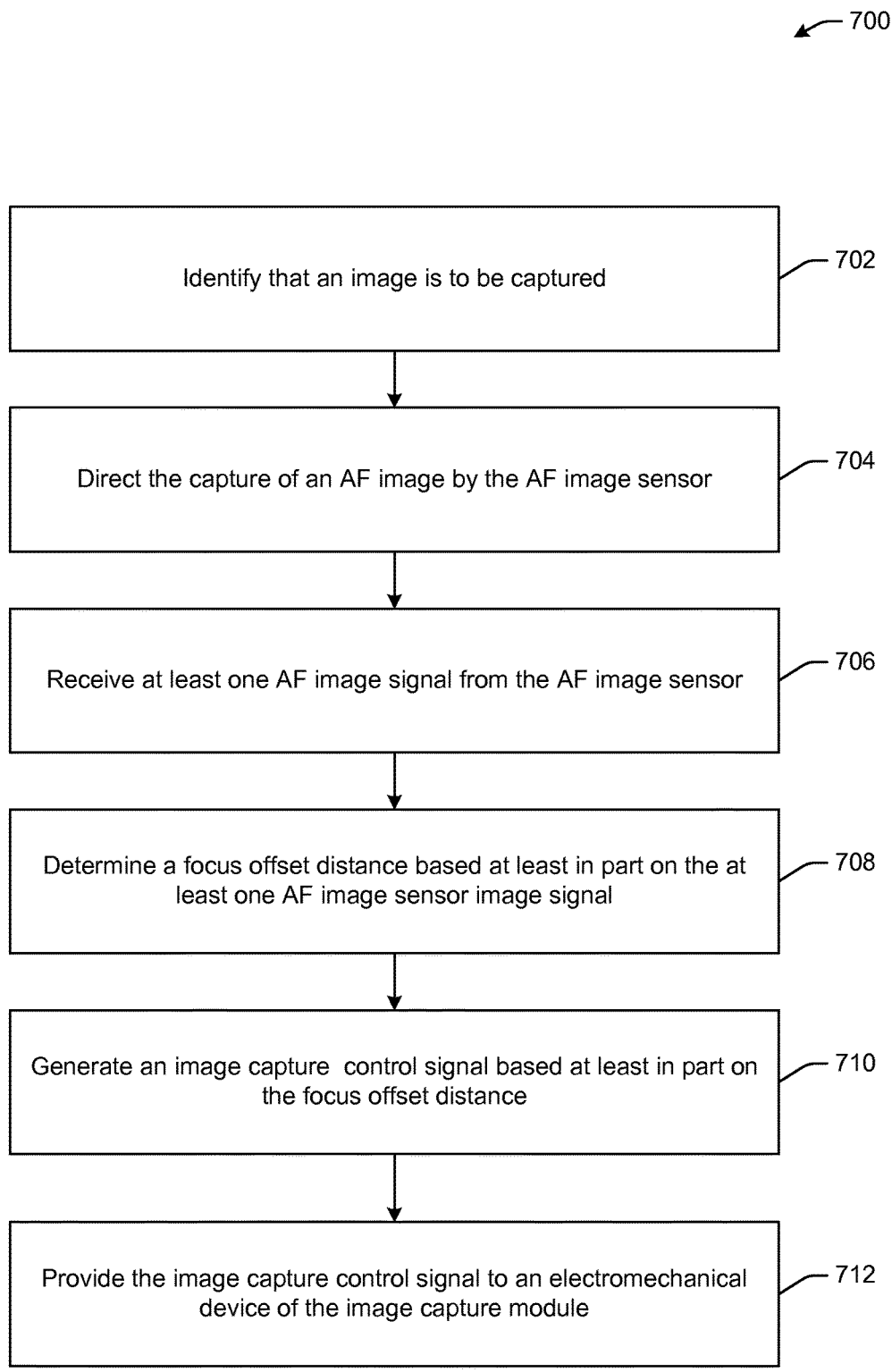
FIG. 7 is a flow diagram illustrating an example method for providing a AF control signal to the image capture module, in accordance with example embodiments of the disclosure.

FIG. 7 is a flow diagram illustrating an example method for providing an AF control signal to the image capture module 140, in accordance with example embodiments of the disclosure. This method 700, in example embodiments, may be performed by the PD controller 210 and the processors 600 thereon in cooperation with one or more entities of user device 200, such as the image capture module 140 and/or the AF controller 240. At block 702, it may be identified that an image is to be captured. In example embodiments, the PD controller 210 and the processor(s) 600 thereon may receive an indication that an image is to be captured, such as from a user input or from another entity, such as an application processor of the user device 200. In example embodiments, a user may launch and/or interact with an imaging application, such as a picture and/or video capture application on the user device 200. If the user selects a shutter function (e.g., a real or virtual shutter), then this user interaction with the user device 200 may indicate that a picture is to be taken of the scene to which the optics (e.g., AF lens assembly 300 and image capture lens assembly 400) are pointed. At block 704, the capture of a PD image by the PD image sensor may be directed. The PD controller 210 and the processor(s) 600 thereon may direct the capture of the PD image by communicating with the PD image sensor 310, such as via signal contacts 316.

At block 706, at least one PD image signal may be received from the PD image sensor. The PD image signal may correspond to a PD image captured by the PD image sensor 310. The PD controller 210 and the processor(s) 600 thereon may further receive a PD image signal corresponding to the PD image acquisition directed by the PD controller 210. This PD image may include the particular object that is to be imaged. The PD image signal may be received by the PD controller 210 via one or more communicative links between the PD image sensor 310 and the PD controller 210, such as signal contacts 316.

At block 708, a focus offset distance of the image capture module may be determined based at least in part on the at least one PD image signal. PD controller 210 may identify a focus point of the particular object to be imaged from the PD image sensor signal. In particular, the level of defocus and/or phase difference may be determined of the particular object to be imaged, and based thereon, identify a focus point of the object to be imaged. In general the greater the defocus, the further the focus point is from the current location of the PD image sensor 310. A phase difference may be determined for the object being imaged in the PD image corresponding to the PD image signal. This may be performed by determining the distance between the intensity peaks corresponding to the object and detected at two different phase detect pixels of the PD image sensor in the PD image signal. The phase difference (e.g., distance between intensity peaks corresponding to the object) may be used to determine the focus point for the image capture module 140. This may be done by accessing a look-up table that maps detected phase difference to focus points of the image capture module 140. From this the focus offset distance may be determined by finding the difference between the current distance between the lens assembly 400 and the primary image sensor 410 and the determined focus point.

Alternatively, the phase difference (e.g., distance between intensity peaks corresponding to the object) may be analyzed to determine a direction and a distance of the focus point of the particular object relative to the location of the PD image sensor 310. In some example embodiments, the relationship between levels of defocus and the focus point relative to the location of the PD image sensor 310 may be stored in a look-up table. In these example embodiments, the look-up table where defocus-to-focus point relationships are stored, such as in storage/memory 610 or an external datastore, may be accessed to determine the focus point of the object in the PD module 110. In other example embodiments, analytical equations/models may be used to determine the relationship between defocus and the focus point relative to the location of the PD image sensor 310. In these example embodiments, once the focus point in the PD module 110 is determined, the focus point in the image capture module 140 may be determined, based at least in part on the focus point of the PD module 110. In some example embodiments, the focus point of the object for the image capture module 140 may be determined from a look-up table that maps the focus points of the PD module 110 with corresponding focus points of the image capture module 140. In other example embodiments, analytical equations and/or models may be utilized to determine the focus point of the object to be imaged for the image capture lens assembly 400 of the image capture module 140. For example, in some cases, the focus point of the image capture module 140 may be calculated using Equation 1.

After determining the focus point to bring the object into focus in the image capture module 140, the current location of the lens assembly 300 may be determined. Based on the difference between the current location of the lens assembly 300 and the desired location of the lens assembly 300 at the focus point of the image capture module 140, a focus offset distance may be calculated.

At block 710, an AF control signal may be generated based at least in part on the focus offset distance. After determining the focus offset distance a control signal corresponding to the focus offset distance, to be provided to the electromechanical device 430 of the image capture module 140 to move the lens assembly 400 to the focus point of the image capture module 140, may be determined. In example embodiments, the AF control signal may be determined from a look-up table, such as a look-up that provides values (e.g., magnitude, frequency, phase, etc.) of AF control signals corresponding to various desired focus offset distances. In some cases, if the look-up table is relatively sparse, then interpolation or extrapolation may be performed to determine the AF control signal. In other example embodiments, the AF control signal may be determined using one or more analytical models and/or equations to derive values (e.g., magnitude, frequency, phase, etc.) of AF control signals corresponding to the desired focus offset distance. In some example embodiments, the AF control signal may be an analog drive signal provided to the electromechanical device 430 to power and/or control the electromechanical device 430 in a manner to obtain a movement substantially equal to the desired focus offset distance to place the lens assembly 400 approximately a distance of the focus point of the image capture module 140 away from the primary image sensor 410 in a direction normal to the lens assembly 400. For example, a DC voltage that corresponds to the magnitude of displacement of a VCM may be provided to a VCM-type electromechanical device 430 on which the lens assembly 400 is coupled. The DC voltage, in example embodiments, may be provided by the digital-to-analog (DAC) component 606 of the PD controller 210 and/or the AF controller 240. At block 712, the AF control signal may be provided to an electromechanical device of the image capture module. In example embodiments, this AF control signal may be provided to the electromechanical device 430 via one or more signal contacts 316.

It should be noted that the method 700 may be modified in various ways in accordance with certain embodiments. For example, one or more operations of the method 700 may be eliminated or executed out of order in other embodiments. Additionally, other operations may be added to the method 700 in accordance with other embodiments.

Figure 8:
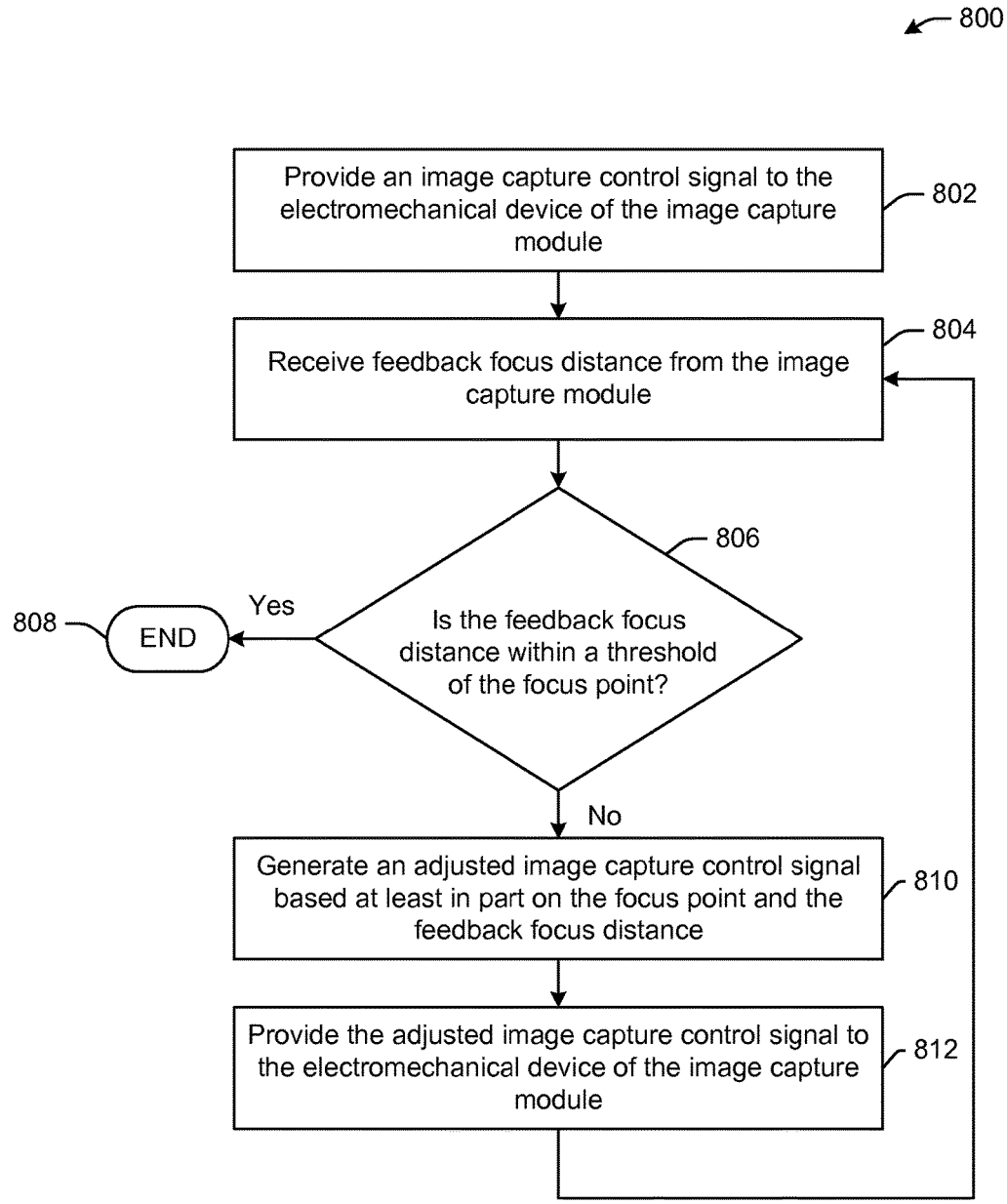
FIG. 8 is a flow diagram illustrating an example method for providing an adjusted AF control signal to the image capture module, in accordance with example embodiments of the disclosure.

FIG. 8 is a flow diagram illustrating an example method 800 for providing an adjusted AF control signal to the image capture module, in accordance with example embodiments of the disclosure. This method 800, in example embodiments, may be performed by the PD controller 210 and the processors 600 thereon in cooperation with one or more entities of user device 200, such as the AF controller 240 and the image capture module 140. At block 802, an AF control signal may be provided to the electromechanical device 430 of the image capture module. These processes may be similar to the processes described in block 712 of method 700 of FIG. 7.

At block 804, a feedback focus distance may be received from the image capture module. The feedback may be signals from displacement sensor 432 that provides information about the current location of the lens assembly 400. The displacement sensor signals may be solicited and/or received by the PD controller 210 or the AF controller 240 from the displacement sensor 432. The feedback focus distance (e.g., the position of the primary image sensor 410 relative to the primary image sensor 410) may be determined based at least in part on the received displacement sensor signals.

At block 806, it may be determined if the feedback focus distance is within a threshold of the focus point for the image capture module. In example embodiments, the threshold may be the depth of focus (DOF) of the image to be captured. In other example embodiments, the threshold may be a fixed distance, such as, for example 1 micometer (um). If it is determined that the feedback focus distance is within the threshold of the focus point, then at block 808 the method 800 may end. Indeed, at this point, the lens assembly 400 had been moved to a position to capture an in-focus image of the object on which it is to focus. If however, it is determined at block 806 that the feedback focus distance is not within a threshold of the focus point, then at block 810, an adjusted AF control signal may be generated based at least in part on feedback focus distance and the focus point. At block 812, the adjusted AF control signal may be provided to the electromechanical device of the image capture module.

It will be appreciated that in example embodiments, the imaging system may not have a feedback mechanism. In some of these embodiments, the electromechanical device 430 may be relatively deterministic. In other words, in these embodiments, the relation between the AF control signal and the displacement effected by the electromechanical device may be highly repeatable, regardless of other forces acting on the electromechanical device 430 and/or the lens assembly 400. For example a piezomotor may have a relatively stiff and/or deterministic response to an AF control signal and in this case, a feedback mechanism may not be necessary.

It will further be appreciated that in some further example embodiments, an open loop calibration may be employed to set the AF control signal to an appropriate level to achieve a desired offset of the electromechanical device 430. In this case, sensor 432 feedback at multiple points may be used to hone in on an appropriate AF control signal that places the lens assembly 400 at the desired location for focus.

It will still further be appreciated that in some example embodiments, the AF control signal from the PD module 110 provided to the electromechanical device 430 may place the lens module 400 close to the point where focus is achieved. At this point, the PD controller 210 or other processors of the user device 200 may perform a relatively fast contrast detection autofocus, such as at a limited number of spatial locations.

It should be noted that the method 800 may be modified in various ways in accordance with certain embodiments. For example, one or more operations of the method 800 may be eliminated or executed out of order in other embodiments. Additionally, other operations may be added to the method 800 in accordance with other embodiments.

Figure 9:
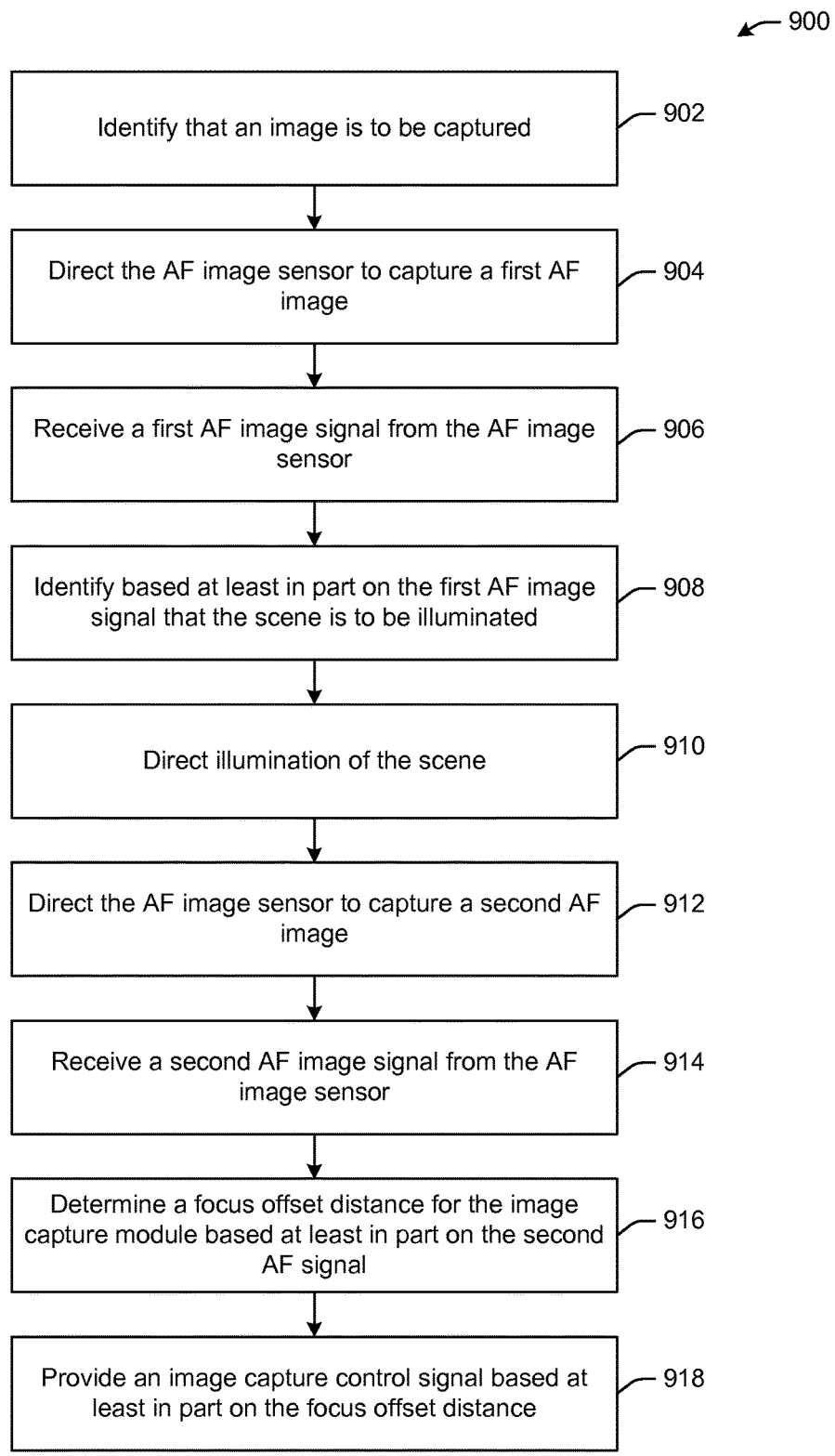
FIG. 9 is a flow diagram illustrating an example method for directing the illumination of a scene to capture a PD image to generate an AF control signal to provide to the image capture module, in accordance with example embodiments of the disclosure.

FIG. 9 is a flow diagram illustrating an example method 900 for directing the illumination of a scene to capture a PD image to generate an AF control signal to provide to the image capture module 140, in accordance with example embodiments of the disclosure. This method 900, in example embodiments, may be performed by the PD controller 210 and the processors 600 thereon. At block 902, it may be identified that an image is to be captured. These processes may be similar to the processes of block 702 of method 700 of FIG. 7. At block 904, the PD image sensor may be directed to capture a first PD image. These processes may be similar to the processes of block 704 of method 700 of FIG. 7. At block 906, a first PD image signal may be received from the PD image sensor. These processes may be similar to the processes of block 706 of method 700 of FIG. 7.

At block 908, it may be identified based at least in part on the first PD image signal that the scene is to be illuminated. In example embodiments, the received first PD image signals may be analyzed and it may be determined that the first PD image was taken under low-light conditions. Images acquired under low-light conditions may lack enough intensity range (e.g., contrast, sharpness, etc.) of the constituent pixels to enable determining a phase difference (e.g., defocus) of the particular object. In other words, a low-light condition may preclude the PD controller 210 from performing a relatively accurate and/or precise PD technique. In other words, the SNR of a PD image captured under low light conditions may be insufficient to provide a reliable PD value.

At block 910, illumination of the scene may be directed. Based at least in part on the determination of a low-light condition, to the illumination of the scene may be directed via an illuminator, such as the LED 260. In example embodiments, the LED 260 may emit light that spans a spectral range that includes near-IR wavelengths (e.g., 750 nm-4000 nm). In example embodiments, the intensity of the LED 260 to provide a PD image that is not at a low-light condition, but also not oversaturated may be determined from the first PD image, or a sequence of first PD images. Therefore, in example embodiments, the intensity of the illumination may be controlled by the PD controller 210.

At block 912, the PD image sensor may be directed to capture a second PD image. Upon illumination of the scene by turning on the LED 260, the processor(s) 600 may be configured to direct the acquisition of a second AF image by the PD image sensor 310, while the scene is illuminated. At block 914, a second PD image signal may be received from the PD image sensor 310. The received second PD image, as generated by the PD image sensor 310, may be responsive to the request for the second PD image. The second PD image, as a result of being acquired while the scene to be imaged is illuminated by the LED 260, may not be in a low-light condition and may be usable for the purposes of determining a focus point, such as by the method 700, as described in FIG. 7.

At block 916, a focus offset distance may be determined for the image capture module based at least in part on the second PD signal. These processes may be similar to the processes of block 708 of method 700 of FIG. 7. At block 918, an AF control signal based at least in part on the focus offset distance may be provided. These processes may be similar to the processes of block 710 and 712 of method 700 of FIG. 7.

It should be noted that the method 900 may be modified in various ways in accordance with certain embodiments. For example, one or more operations of the method 900 may be eliminated or executed out of order in other embodiments. Additionally, other operations may be added to the method 900 in accordance with other embodiments.

Embodiments may be provided as a computer program product including one or more non-transitory machine-readable storage media having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claims is:

1. A mobile device, comprising:
a first lens to receive first light reflected by an object;
a Red-Green-Blue (RGB) image sensor to receive at least a portion of the first light via the first lens;
a voice coil motor (VCM) mechanically coupled to the first lens to move the first lens relative to the RGB image sensor;
a second lens to receive second light reflected by the object, wherein the first light does not include the second light;
a panchromatic image sensor to receive at least a portion of the second light via a second lens; and
a controller comprising:
at least one memory that stores computer-executable instructions; and
at least one processor that accesses the at least one memory and executes the computer-executable instructions to perform operations comprising:
receiving a PD image data representing a PD image of the object from the panchromatic image sensor, wherein the PD image data is indicative of the at least a portion of the second light received by the panchromatic image sensor;
determining a phase difference in the PD image by detecting a level of defocus of the object in the PD image;
determining, using a look-up table, a focus offset distance corresponding to the phase difference;
generating a first VCM control signal using the focus offset distance;
providing the first VCM control signal to the VCM;
receiving, from a hall sensor coupled to the first lens, a first displacement value indicative of movement of the first lens;
determining that the first displacement value is not within a depth of focus (DOF) of the focus offset distance;
providing, based at least in part on the first VCM control signal, a second VCM control signal to the VCM to displace the first lens from the RGB image sensor in a direction normal to the first lens by the focus offset distance; and capturing, by the RGB image sensor, an image of the object after the first lens is displaced.

2. The mobile device of claim 1, further comprising an infrared (IR) illuminator and wherein the PD image data is a second PD image data and wherein receiving the PD image data from the panchromatic image sensor comprises:

receiving a first PD image data;

identifying that the first PD image data has an intensity dynamic range below a threshold value;

causing illumination of the object by the IR illuminator; and receiving the second PD image data.

3. The mobile device of claim 1, wherein providing the VCM control signal to the VCM comprises:

generating the second VCM control signal by modifying the first VCM control signal based at least in part on a difference between the focus offset distance and the first displacement value;

providing the second VCM control signal to the VCM;

receiving, from the hall sensor, a second displacement value indicative of the distance between the first lens and the RGB image sensor; and identifying that the second displacement value is within the DOF of the focus offset distance.

4. The mobile device of claim 1, wherein a size of a pixel of the panchromatic image sensor is greater than a size of a pixel of the RGB image sensor.

5. A method, comprising:

receiving, by a phase detection (PD) controller, image data from a first image sensor, the image data corresponding to an image acquired of an object using a first lens assembly;

determining, by the PD controller and based at least in part on the image data, a focus offset distance corresponding to a second lens assembly associated with a second image sensor, wherein the image data is based at least in part on first light received by the first lens assembly, and wherein the first light is not received by the second lens assembly;

determining, by the PD controller, a first control signal based at least in part on the focus offset distance;

determining, by the PD controller and using a sensor coupled to the second lens assembly, a first displacement of the second lens assembly from the second image sensor;

identifying, by the PD controller, that the first displacement is not within a spatial threshold of the focus offset distance;

providing, by the PD controller, based on the first control signal, a second control signal to an electromechanical device coupled to the second lens assembly to displace the second lens assembly relative to the second image sensor.

6. The method of claim 5, further comprising:

determining, by the PD controller, that an image capture has been requested; and causing, by the PD controller, acquisition of a first image of the object.

7. The method of claim 5, wherein the first image sensor includes a first plurality of first photosensitive pixels and the second image sensor includes a second plurality of second photosensitive pixels, and wherein each of the first photosensitive pixels have an area greater than each of the second photosensitive pixels.

8. The method of claim 5, wherein the image data is a second image data and wherein receiving the image data from the first image sensor comprises:

receiving, by the PD controller, a first image data;

identifying, by the PD controller, that the first image data has an intensity dynamic range below a threshold value;

directing, by the PD controller, an illumination of the object by an illuminator;

directing, by the PD controller, an acquisition of the second image data while the object is illuminated by the illuminator; and receiving, by the PD controller, the second image data.

9. The method of claim 8, wherein the illuminator emits light having wavelengths between 750 nanometers (nm) and 1125 nm, and wherein the first image sensor is configured to detect at least a portion of the emitted light reflected from the object.

10. The method of claim 5, wherein providing the first control signal to the electromechanical device comprises:

generating, by the PD controller, the second control signal based at least in part on the first control signal and the first displacement;

providing, by the PD controller, the second control signal to the electromechanical device;

receiving, by the PD controller, a second indication of a second displacement of the second lens assembly from the sensor coupled to the second lens assembly; and identifying, by the PD controller, that the second displacement is within the spatial threshold of the focus offset distance.

11. The method of claim 5, wherein determining the focus offset distance further comprises:

determining, by the PD controller and based at least in part on the image data, a first focus point of the first lens assembly;

identifying, by the PD controller, a first focal length of the first lens assembly and a second focal length of a second lens assembly; and determining, by the PD controller, a second focus point of the second lens assembly based at least in part on the first focus point, the first focal length, and the second focal length.

12. The method of claim 11, wherein determining the focus offset distance further comprises:

determining, by the PD controller, a current distance of the second lens assembly from the second image sensor; and calculating, by the PD controller, the focus offset distance as a difference between the current distance and the second focus point.

13. The method of claim 5, wherein determining the first control signal is based at least in part on the focus offset distance comprises identifying a direct current (DC) voltage corresponding to the focus offset distance.

14. A user device, comprising:

a first image sensor to receive first reflected light from an object using a first lens assembly;

a second image sensor and a second lens assembly to receive second reflected light from the object;

an electromechanical device mechanically coupled to the second lens assembly and configured to move the second lens assembly; and a PD controller comprising:

memory that stores computer-executable instructions; and a processor that accesses the memory, wherein the processor executes the computer-executable instructions to perform operations comprising:

receiving a PD image data corresponding to the object from the first image sensor, wherein the PD image data is based at least in part on first light received by the first lens assembly, and wherein the first light is not received by the second lens assembly;

determining a phase difference between at least two optical intensity peaks of light in the PD image data;

determining a focus offset distance corresponding to the phase difference;

generating a first control signal based at least in part on the focus offset distance;

receiving, using a sensor coupled to the second lens assembly, a first displacement of the second lens assembly from the second image sensor;

identifying, that the first displacement is not within a spatial threshold of the focus offset distance; and sending, based on the first control signal, a second control signal to the electromechanical device.

15. The user device of claim 14, wherein the operations further comprise:

identifying that an image capture has been requested; and causing acquisition of a PD image of the object corresponding the PD image data using the first image sensor.

16. The user device of claim 14, wherein determining the focus offset distance further comprises:

determining, based at least in part on the PD image data, a first focus point associated with the first lens assembly;

identifying a first focal length of the first lens assembly and a second focal length of the second lens assembly; and determining a second focus point associated with the second lens assembly based at least in part on the first focus point, the first focal length, and the second focal length.

17. The user device of claim 14, further comprising an illuminator, wherein the PD image data is a second PD image data and wherein receiving the PD image data from the first image sensor comprises:

receiving a first PD image data;

identifying that the first PD image data has an intensity dynamic range below a threshold level;

directing an illumination of the object by the illuminator;

directing an acquisition of the second PD image data while the object is illuminated; and receiving the second PD image data.

18. The user device of claim 17, wherein the illuminator emits at least a portion of light in a range of wavelengths between 750 nanometers and 1125 nm, and wherein the first reflected light comprises at least a portion of the emitted light reflected from the object.

19. The user device of claim 14, wherein generating the first control signal based at least in part on the focus offset distance comprises identifying a direct current (DC) control voltage corresponding to the focus offset distance.

20. The user device of claim 14, wherein the first image sensor includes a first plurality of first photosensitive pixels and the second image sensor includes a second plurality of second photosensitive pixels, and wherein each of the first photosensitive pixels have an area greater than each of the second photosensitive pixels.

* * * * *